United States Patent
Bertagna et al.

(10) Patent No.: US 8,760,286 B2
(45) Date of Patent: *Jun. 24, 2014

(54) SYSTEM AND METHOD FOR COMMUNICATION WITH A TRACKING DEVICE

(75) Inventors: Patrick E. Bertagna, Los Angeles, CA (US); Michael J. DiBella, Los Angeles, CA (US)

(73) Assignee: Global Trek Xploration Corp., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/443,180

(22) Filed: Apr. 10, 2012
(Under 37 CFR 1.47)

(65) Prior Publication Data
US 2012/0202519 A1    Aug. 9, 2012

Related U.S. Application Data

(63) Continuation of application No. 12/322,941, filed on Feb. 9, 2009, now Pat. No. 8,154,401.

(60) Provisional application No. 61/065,116, filed on Feb. 8, 2008.

(51) Int. Cl.
*G08B 1/08*    (2006.01)

(52) U.S. Cl.
USPC ............... 340/539.13; 701/200; 340/573.1; 342/357.2

(58) Field of Classification Search
USPC ............... 340/573.1–573.7, 539.1, 539.11, 340/539.13, 539.15, 539.16, 539.23; 342/357.2, 357.23; 701/200, 213, 214
See application file for complete search history.

(56) References Cited

U.S. PATENT DOCUMENTS

| | | | | |
|---|---|---|---|---|
| 5,982,281 | A | * | 11/1999 | Layson, Jr. ............... 340/539.13 |
| 6,043,748 | A | * | 3/2000 | Touchton et al. ........... 340/573.3 |
| 6,054,928 | A | * | 4/2000 | Lemelson et al. .......... 340/573.4 |
| 7,996,887 | B2 | * | 8/2011 | Garbow et al. .................... 726/8 |
| 2007/0229350 | A1 | * | 10/2007 | Scalisi et al. .................. 342/350 |
| 2008/0055155 | A1 | * | 3/2008 | Hensley et al. .......... 342/357.04 |

* cited by examiner

*Primary Examiner* — George Bugg
*Assistant Examiner* — Edny Labbees
(74) *Attorney, Agent, or Firm* — Larry E. Henneman, Jr.; Gregory P. Gibson; Henneman & Associates, PLC

(57) ABSTRACT

A system and method for providing communication with a tracking device are disclosed. An example tracking device includes a location detector, a communication device, memory, a processor, and a configuration routine. The location detector is operative to determine locations of the tracking device. The communication device is operative to communicate with a remote system. The memory stores data and code, the data including location data determined by the location detector and configuration data. The processor is operative to execute the code to impart functionality to the tracking device. The functionality of the tracking device depends at least in part on the configuration data. The configuration routine is operative to modify the configuration data responsive to communications from the remote system. Thus, functional access to the tracking device is provided to the remote system.

36 Claims, 5 Drawing Sheets

SYSTEM AND METHOD FOR COMMUNICATION WITH A TRACKING DEVICE

RELATED APPLICATIONS

This application is a continuation of U.S. patent application Ser. No. 12/322,941 (now U.S. Pat. No. 8,154,401), filed Feb. 9, 2009 by at least one common inventor, which claims the benefit of U.S. Provisional Patent Application No. 61/065,116 filed Feb. 8, 2008 by at least one common inventor, all of which are incorporated herein by reference in their respective entireties.

BACKGROUND

1. Technical Field

This invention relates generally to a system and method for monitoring location, and more specifically to a system and method for enabling communication with a tracking device.

2. Background Art

Currently, systems exist for tracking the location of persons and/or property. Generally, such systems include a tracking device that transmits the location of the tracking device to a central station, which may then take some action based on the location data.

Known systems have generally been very limited with respect to the communication capabilities between the tracking device and the central station. For example, communications from a tracking device to a central station have typically been limited to the transmission of a device identifier in combination with location data and, in some cases, a distress signal.

Perhaps, the limited communication between tracking devices and central stations has evolved due to the disadvantages of prior art tracking systems. For example, in personal tracking devices power consumption is a serious concern, because the devices power storage capacity is a limiting factor with respect to the amount of communication that can take place. Another concern is the cost of network access (e.g., mobile phone air time).

What is needed is a system and method for providing enhanced communication with tracking devices. What is also needed is a system and method for providing enhanced communication with tracking devices, while minimizing power consumption. What is also needed is a system and method for providing enhanced communication with tracking devices, while minimizing network air time.

SUMMARY

A system and method for providing communication with a tracking device is disclosed. The inventor has discovered that several advantages are provided by the communication system and methods disclosed herein. These advantages include the efficient use of network access time and the conservation of tracking device power. Additional advantages include enhanced efficiency and flexibility in the communication of location data from tracking devices. Yet another advantage is that functional access (e.g., setting and/or resetting of functions, parameters, etc.) to the tracking device is provided to the central station. These and other advantages will be apparent to those skilled in the art in view of the following disclosure.

In a disclosed example, a tracking device includes a location detector, a communication device, memory, a processor, and a configuration routine. The location detector (e.g., a Global Positioning Satellite receiver) is operative to determine locations of the tracking device. The communication device (e.g., a cell phone modem) is operative to communicate with a remote system (e.g., a central station, subscriber server, etc.). The memory stores data and code, the data including location data determined by the location detector and configuration data. The processor is operative to execute the code to impart functionality to the tracking device. The functionality of the tracking device depends at least in part on the configuration data. The configuration routine is operative to modify the configuration data responsive to a communication from the remote system. Thus, functional access to the tracking device is provided to the remote system.

The tracking device can be configured and reconfigured in many ways. In one example, the configuration data modifiable responsive to the communication from the remote system at least partially determines an interval for communicating the location data to the remote system. In another example, the configuration data modifiable responsive to the communication from the remote system at least partially determines an interval for buffering the location data when the communication device is unable to communicate the location data to the remote system (e.g., out of communication range). The interval for buffering the location data can be, for example and without limitation, a time interval (e.g., every 30 minutes) or a distance interval (e.g., whenever the tracking device moves 50 yards). In yet another example, the configuration data modifiable responsive to the communication from the remote system at least partially determines a power state of the location detector. In yet another example, the configuration data modifiable responsive to the communication from the remote system at least partially determines a monitored condition with respect to the location of the tracking device (e.g., a "geofence"). For example and without limitation, the monitored condition can be a geographical area (e.g., circular or polygonal, etc.), a velocity, a distance, a time/distance relationship (e.g., a time the tracking device remains stationary), or any combination of these. In yet another example, the configuration data modifiable responsive to the communication from the remote system at least partially determines a threshold distance between one of the locations and subsequent ones of the locations for storing the subsequent ones of the locations (e.g., only buffer location data if the tracking device has moved at least the threshold distance). As even yet another example, the configuration data modifiable responsive to the communication from the remote system at least partially determines an interval for communicating diagnostic information from the tracking device to the remote system.

The example tracking device also includes a data transfer routine operative to communicate operational data between the tracking device and the remote system. In one example, the tracking device includes a battery and the data transfer routine responsive to a request from the server is operative to communicate data indicative of the status of the battery to the remote system. In another example, the data transfer routine responsive to a request from the server is operative to communicate data indicative of a radio signal strength to the remote system. In yet another example, the data transfer routine responsive to a request from the server is operative to communicate data indicative of a status of the location detector to the remote system. In yet another example, the data transfer routine responsive to a status of a monitored location condition (e.g., a geofence definition) is operative to communicate data indicative of a violation or satisfaction of the location condition to the remote system. As yet another example, the data transfer routine responsive to a request from the server is operative to communicate diagnostic data to the remote system.

Another feature of the example tracking device is that when the communication device is unable to establish a connection with the remote system, the location data is accumulated in the memory. Then, when the communication device is able to establish a connection with the remote server, the data transfer routine communicates the accumulated data to the remote system.

An example method for communicating with a tracking device is also disclosed. The method includes communicating with the tracking device via a wireless network and providing configuration data to the tracking device via the wireless network. The configuration data causes the tracking device to operate according to a first configuration. The method further includes receiving processed data from the tracking device. The processed data is generated by the tracking device in the first configuration. The method further includes providing new configuration data to the tracking device via the wireless network. The new configuration data changes the first configuration of the tracking device to a different configuration. The method further includes receiving additional processed data from the tracking device. The additional processed data is generated by the tracking device in the different configuration.

In the example method, the configuration data at least partially determines a location data reporting interval. In another example method, the configuration data at least partially determines a location data buffering interval. In yet another example method, the configuration data at least partially determines a power state of the tracking device. In yet another example method, the configuration data at least partially determines a location based condition that if violated or satisfied causes an indication of the violation or satisfaction of the location based condition to be communicated from the tracking device to the remote system. In yet another example method, the configuration data at least partially determines a diagnostic reporting interval. In yet another example method, the configuration data at least partially determines a distance threshold for buffering location data. In yet another example method, the processed data includes data indicative of a battery status of the tracking device. In yet another example method, the processed data includes data indicative of a radio signal strength determined by the tracking device. In yet another example method, the processed data includes data generated by a diagnostic routine of the tracking device.

Many other detailed examples are disclosed in the communication protocol specification set forth below.

BRIEF DESCRIPTION OF THE DRAWINGS

The present invention is described with reference to the following drawings, wherein like reference numbers denote substantially similar elements.

DETAILED DESCRIPTION

Figure 1:
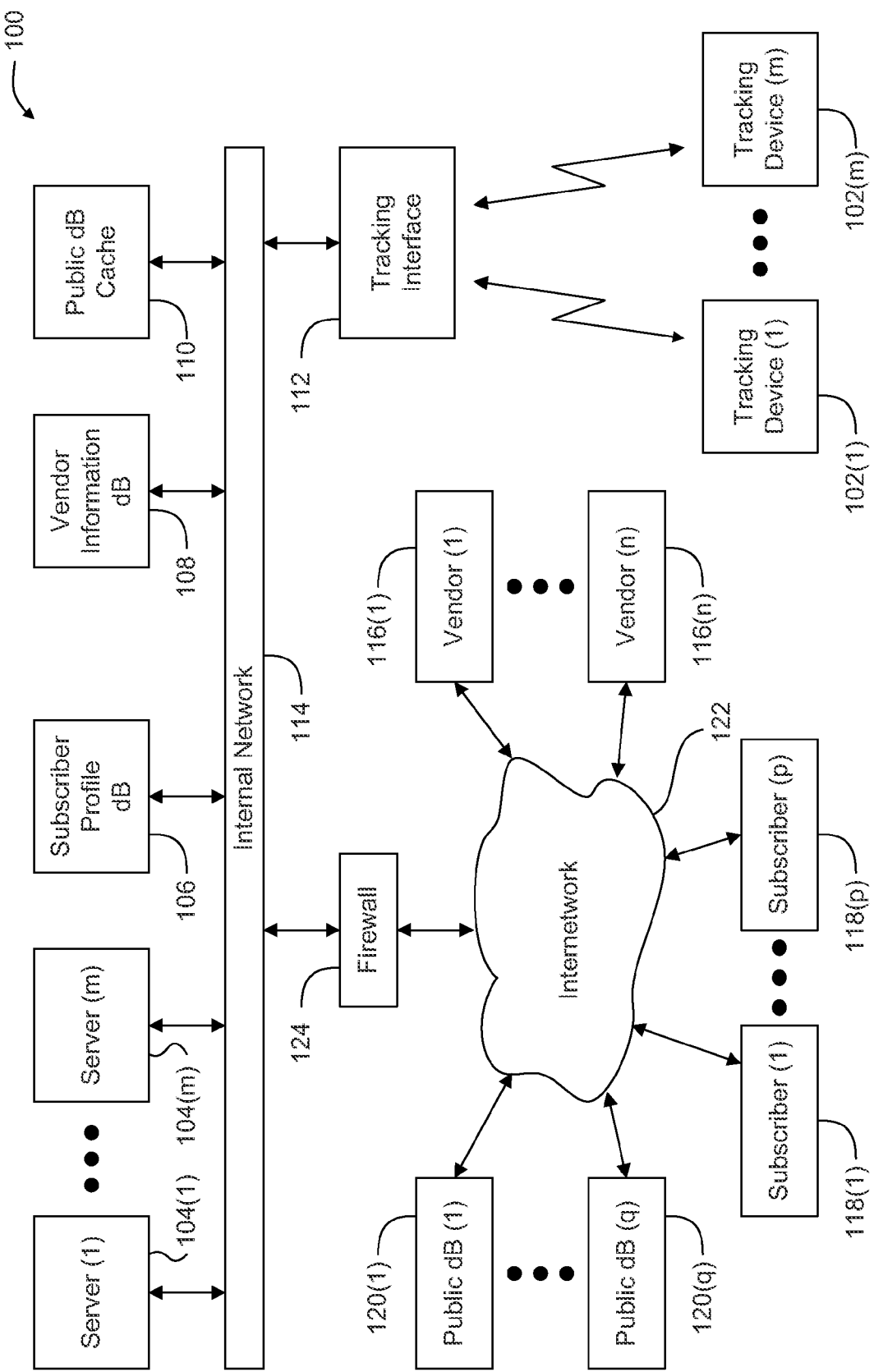
FIG. 1 is a block diagram of a tracking system.

FIG. 1 is a block diagram of a system 100 for tracking and/or monitoring one or more tracking devices 102(1-m). System 100 includes one or more servers 104(1-m), a subscriber profile database 106, a vendor information database 108, a public database cache 110, and tracking interface 112, all intercommunicating via an internal network 114. System 100 communicates with remote components including one or more vendors 116(1-n), one or more subscribers 118(1-p), and one or more public databases 120(1-q), all via an internetwork 122 (e.g., the Internet). A firewall 124 provides a measure of security for internal network 114 against threats via internetwork 122.

Servers 104 host services for subscribers 118 and/or other authorized users that facilitate the tracking and/or monitoring of the location of tracking devices 102. Subscriber profile database 106 stores information associated with particular subscribers 118 and/or other users of system 100. Vendor information database 108 stores information associated with vendors 116 that provide goods and or services that can be made available to subscribers 118 and/or other users of system 100 based on information from subscriber profile database 106 and/or location data received from tracking devices 102. Public database cache 110 provides temporary storage for data retrieved from public databases 120. Tracking interface 112 transmits (via wireless communication) data and commands to tracking devices 102 and receives data (e.g., location data, sensor readings, distress signal, etc.) from tracking devices 102. Vendors 116 offer goods and services that may be offered to subscribers and other users of system 100 as described above. In addition, information associated with vendors (e.g., type of business) can be used to help define boundaries used to monitor tracking devices 102. Similarly, public databases 120 provide information (e.g., sex offender registries, etc.) that can be used as criteria for defining boundaries.

Subscribers 118 are the primary users of system 100 and interact with servers 104 to define tracking criteria and to obtain information and alerts regarding the tracking of associated tracking devices 102. In this example, the primary users are referred to as subscribers, because it is expected that users will be willing to pay for the right to use system 100. However, it should be understood that system 100 is not limited to a subscription type business model. For example, access to system 100 could be provided to users on a free basis, relying on some other business model to raise revenue.

In addition communication between tracking devices 102 and servers 104, the communication methods described herein can be used to provide direct communication between tracking devices 102 and subscribers 118 via a communication link (e.g., mobile phone network), which is not shown in FIG. 1. Similarly, the communication methods described herein can be used to provide direct communication between tracking devices 102 (e.g., GPS enabled cell phone to GPS enabled cell phone). In that case tracking devices 102 can function as both a tracking device and a subscriber system.

Figure 2:
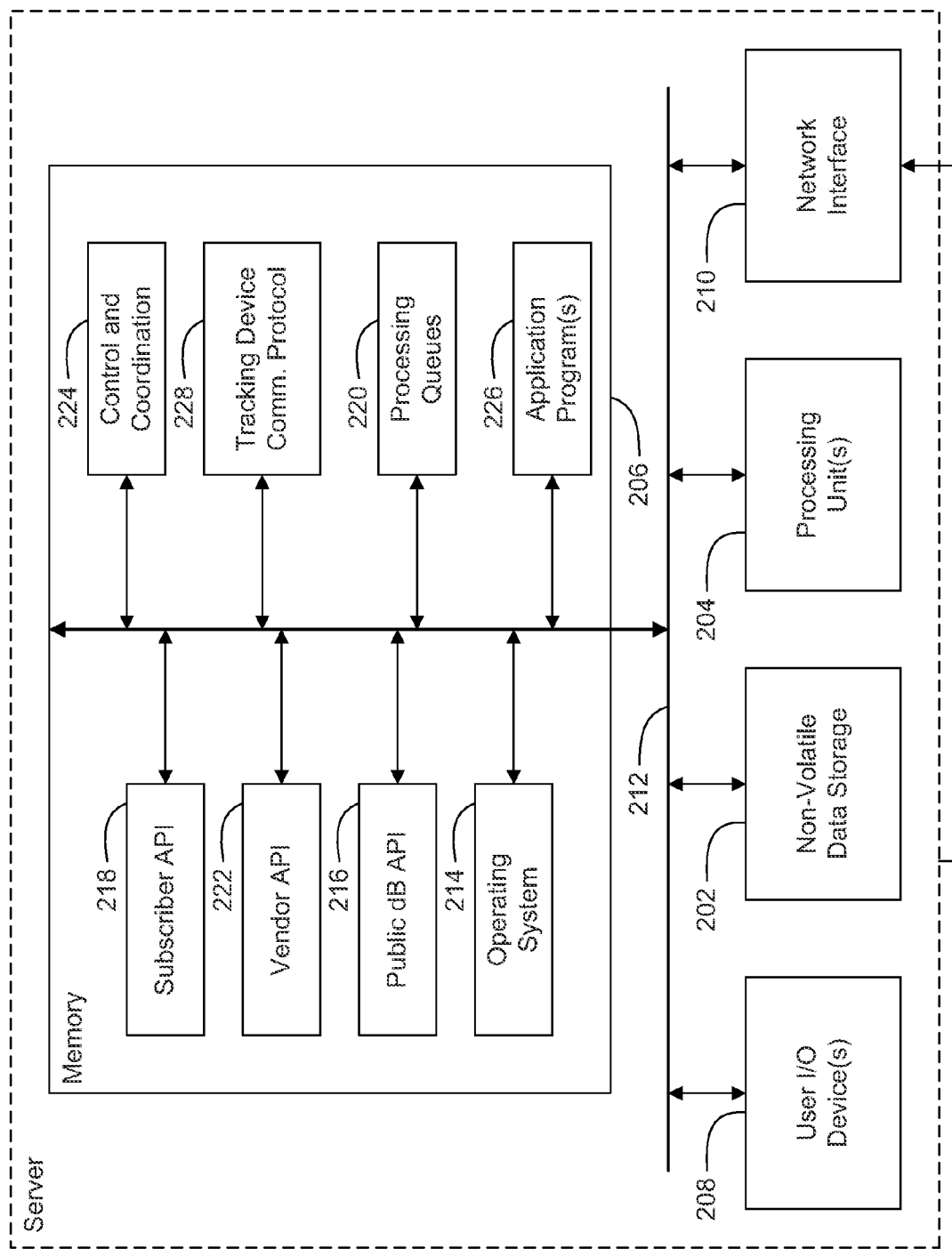
FIG. 2 is a block diagram of a server of the tracking system of FIG. 1.

FIG. 2 is a block diagram of a server 102 of tracking system 100. Server 102 includes non-volatile data storage 202, one or more processing units 204, memory 206, user I/O devices 208, and a network interface 210. Nonvolatile data storage 202 stores data and code that is retained even when server 104 is powered down. Memory 206 stores data and code that when processed by processing unit(s) 204 imparts functionality to server 104. User input/output devices 208 (e.g., keyboard, mouse, monitor, etc.) provide a means of interaction between server 104 and a local human user. Network interface 210 provides a communication link to other components on internal network 114 and internetwork 122.

For the sake of clear explanation data and code are shown in memory 206 as functional blocks. It should be understood, however, that the various functions of server 104 need not be run in any particular location of memory 206 and may grouped in any useful manner. For example, the several application program interfaces (APIs) shown could be grouped into a single API.

Memory 206 includes an operating system 214, public database API 216, subscriber API 218, processing queues 220, vendor API 222, control and coordination routines 224, application programs 226, and a tracking device communication protocol 228. Operating system 214 provides low level control of server 104 and provides a platform on top of which the other modules can operate. Application programs 226 are tracking service programs that receive and process location and/or sensor data from tracking devices 102, process the received data, communicate with subscribers 118, read and/or update subscriber profile database 106, search remote data sources, and so on. Public database API 216, vendor API 222, and subscriber API 218 provide a means of communication between application programs 226 and public databases 120, vendors 116, and subscribers 118, respectively. Control and coordination module 224 provides overall control and coordination of the tracking services provided by server 104. Processing queues 220 provide temporary storage for tracking data that is being processed.

Tracking device communication protocol 228 defines a protocol for communicating with tracking device 102. In this particular embodiment, this communication occurs via network 114, tracking interface 112, and the wireless connection with tracking devices 102. It is sometimes, therefore, referred to as the over-the-air protocol. The definitions and functionality of an example tracking device communication protocol 228 is fully described below.

Figure 3:
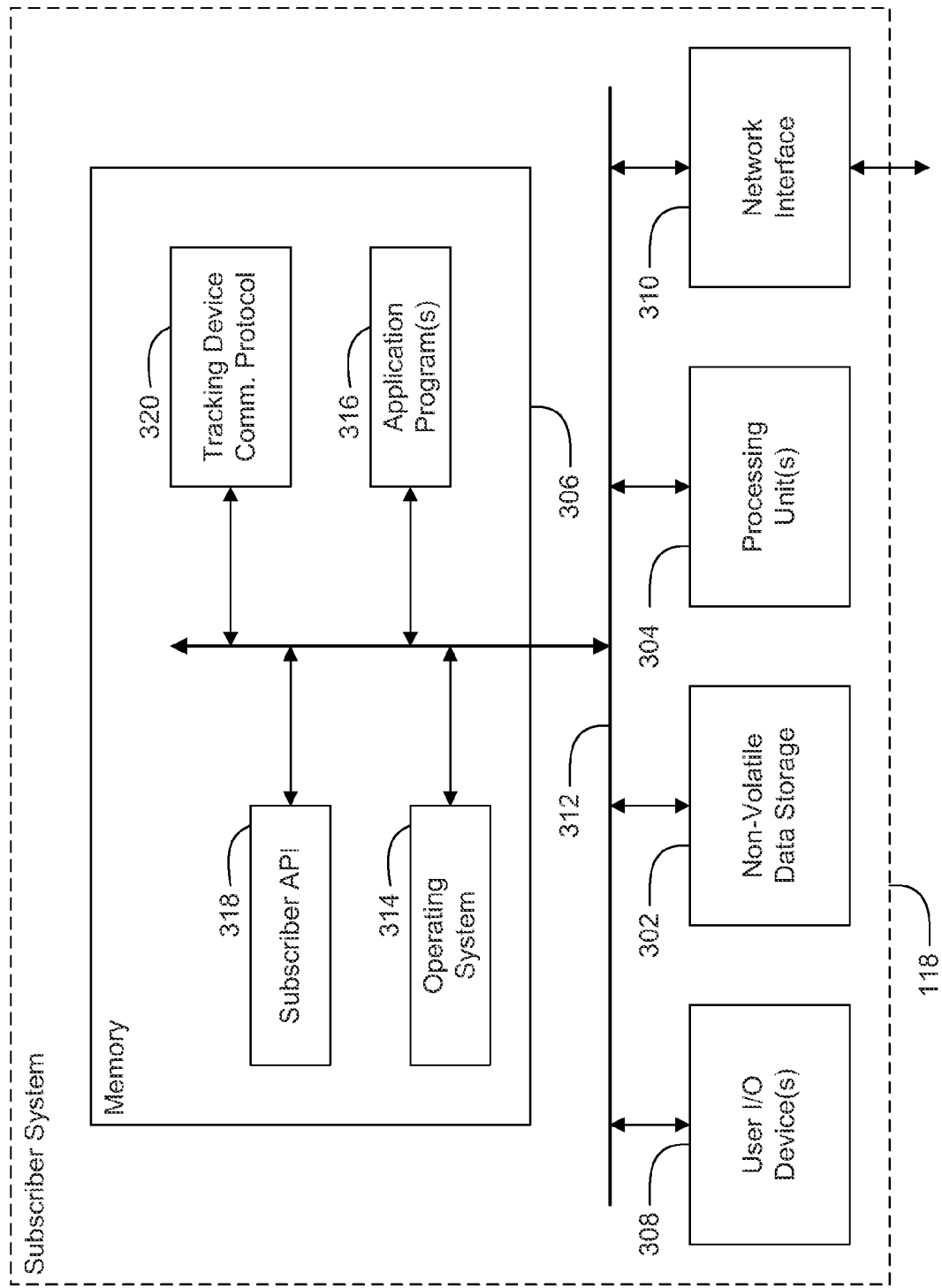
FIG. 3 is a block diagram of a subscriber system of the tracking system of FIG. 1.

FIG. 3 is a block diagram of a subscriber system 118 of tracking system 100. Subscriber system 118 includes non-volatile data storage 302, one or more processing units 304, memory 306, user I/O devices 308, and a network interface 310, all intercommunicating via a bus 312. Memory 306 includes operating system 314, application programs 316, subscriber API 318, and tracking device communication protocol 320. Application programs 316 provide various tracking based services (e.g., set up tracking account, associate particular tracking devices 102 with user account, receive and/or display real time and/or historical location information associated with particular tracking devices 102, and so on). Subscriber API 318 (in conjunction with subscriber API 218 of server 104 shown in FIG. 2) facilitates communication between application programs 316 of subscriber system 118 and application programs 226 of server 104 (FIG. 2).

Tracking device communication protocol 320 is similar to tracking device communication protocol 228 of server 104, except that tracking device communication protocol 320 resides on a subscriber system 118. Therefore, tracking device communication protocol 320 facilitates direct communication between subscriber system 118 and tracking device 102 via a separate communication link (not shown), such as a mobile telephone network.

Figure 4:
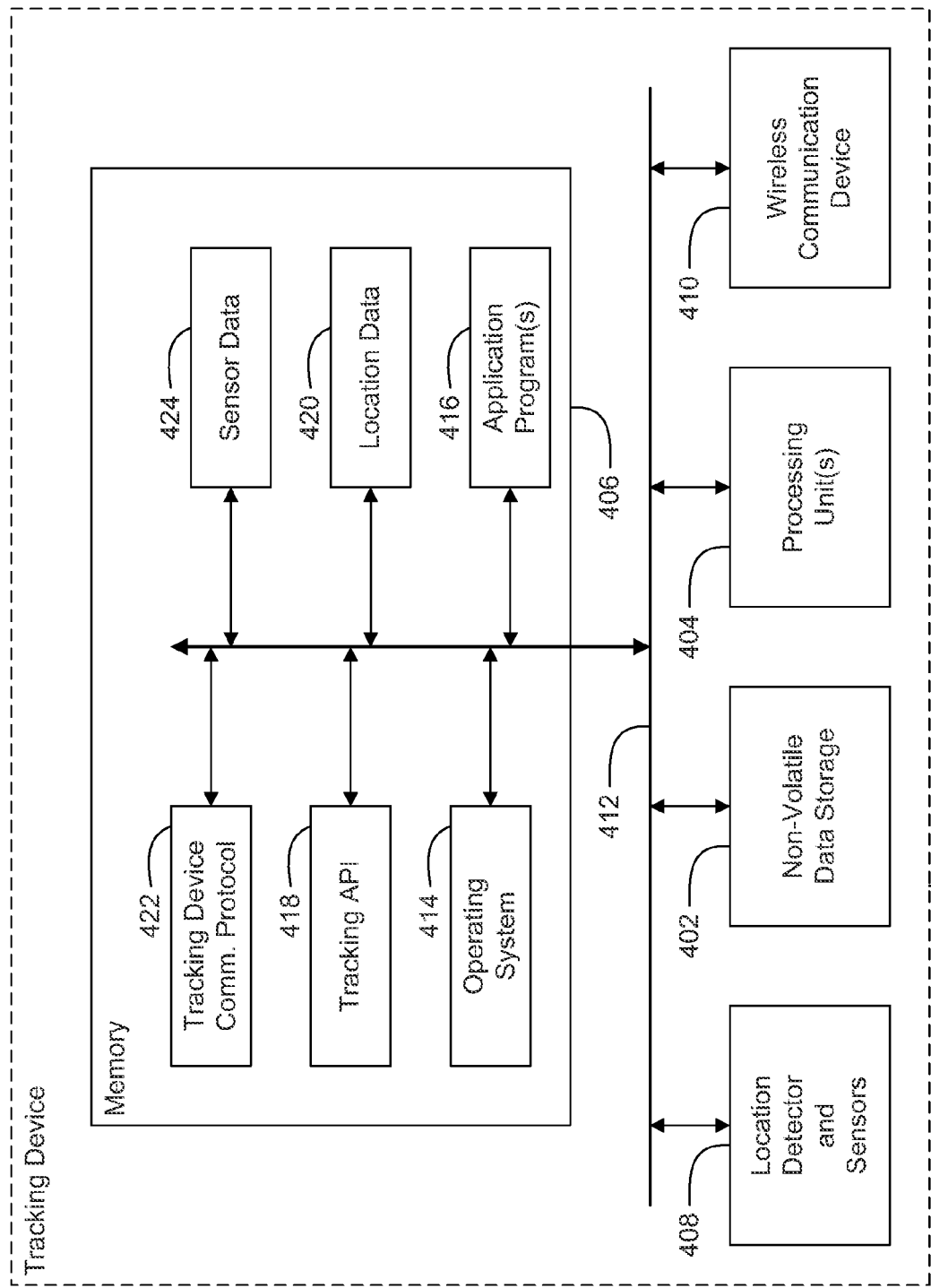
FIG. 4 is a block diagram of a tracking device of the tracking system of FIG. 1.

FIG. 4 is a block diagram of a tracking device 102 of tracking system 100. Tracking device server 102 includes non-volatile data storage 402, one or more processing unit(s) 404, memory 406, location detector (e.g., GPS receiver) 408 with optional sensors (e.g., temperature sensor, motion sensor, etc.), and a wireless communication device 410, all intercommunicating via a bus 412. Memory 406 includes an operating system 414, application programs 416, a tracking API 418, location data 420, tracking device communication protocol 422, and sensor data 424. Application programs 416 facilitate the processing of location data 420 and/or sensor data 424, provide alerts and/or updates to server 104 (FIG. 1), facilitate updates to existing routines or the addition of new routines, and provide any other specified functionality for tracking device 102. For example, application programs 416 can be updated or replaced by server 104 via tracking interface 112. Tracking API facilitates communication between application programs 416 and application programs 226 of server 104, for example, to communicate location data from tracking device 102 to server 104. Sensor data 424 and location data 420 can be accessed by application programs 416 as needed. Data indicative of the velocity of tracking device 102 can be characterized as either sensor data or location data. Tracking device communication protocol 422 is similar to tracking device communication protocol 228, except that tracking device protocol 422 operates on the device side of the communication link.

The following is a detailed description of a particular example of a tracking device communication protocol.

1. Gradient Fields 1.1 Overview

Many of the fields within the structures in this document use index values to pass a value measured by or stored at the device.

When a data field is defined as a gradient, the firmware will calculate an index value as the number of increments from a defined base value. This value, an integer, will be placed within the structure for transmission.

$$index=(measurement-base)/increment$$

When the server receives the index value, that actual measured value is calculated by first retrieving the pre-defined values for base, increment, and unit of measure from a table lookup. These values are stored based on Device Type and Firmware Version, and are applied uniformly for all devices sharing these characteristics.

Once the server has retrieved the conversion values, the actual measurement value is calculated as $$measurement=base+(index*increment)$$

The server will can then store the calculated result as a high-precision value in the database. System presentation layers can convert these values to the localized measurement system for display, using the unit of measure field as a helper.

1.2 Field List with Suggested Metrics

The following table lists the structure fields defined as gradient fields. All gradient fields are defined as integer values.

The suggested base and increment are suggested values only. The developer must decide the actual base and increment to meet the requirements for range and granularity imposed by the specific implementation.

| Field Type Definition | Data Type | Base | Increment | Unit of Measure | Range (Rounded) |
|---|---|---|---|---|---|
| RSSI | Byte | −113 | 2 | dBm | −113 to 397 dBm |
| BATTERY | Unsigned Short | 0 | 1 | mV | 0 to 65.5 volts |
| ALTITUDE | Unsigned Short | −4000 | 1 | Decimeter | −400 to 6,153 meters/−1312 to 20,188 feet |
| SPEED | Unsigned Short | 0 | 1 | Dekameters | 0 to 6,553 meters per hour/0 to 407 miles per hour |

-continued

| Field Type Definition | Data Type | Base | Increment | Unit of Measure | Range (Rounded) |
|---|---|---|---|---|---|
| BEARING | Unsigned Short | 0 | 1 | $1/100^{ths}$ of a degree | 360 degrees |
| DISTANCE | Unsigned Short | 0 | 1 | Hectometers | 0 to 6,553 kilometers/0 to 4,072 miles |
| DOP | Byte | 0 | 0.2 | Absolute | 0 to 50.8 |
| VDOP | Byte | 0 | 0.2 | Absolute | 0 to 50.8 |
| HDOP | Byte | 0 | 0.2 | Absolute | 0 to 50.8 |
| GPSSNR | Byte | 0 | 1 | dB | 0 to 255 dB |

2. Data Types

The following data types are referenced in this document.

2.1 Primitives

| Name | Byte Length | Comment |
|---|---|---|
| Byte | 1 | No type checking |
| Short Integer | 2 | Integer values from −32,768 to 32,767. Little endian. |
| Unsigned Short | 2 | Integer values from 0 to 65,535. Little endian. |
| Integer | 4 | Integer values from −2147483648 to 2147483647. Little endian. |
| Unsigned Integer | 4 | Integer values from 0 to 4,294,967,296. Little endian. |
| Float | 4 | A single-precision 32-bit IEEE 754 floating point value. |

2.2 Defined Types

| Name | Data Type | Length | Comment |
|---|---|---|---|
| DATETIME | Byte Array | 6 | YMDHMS |
| CRC32 | Integer | 4 | Result of CRC-32 hash |
| LATITUDE | Float | 4 | |
| LONGITUDE | Float | 4 | |
| DATETIME | Unsigned Integer | 4 | |
| RSSI | Byte | 1 | Gradient field containing the data transceiver Received Signal Strength Indication |
| BATLEVEL | Unsigned Short | 2 | Gradient field containing battery condition. |
| ALTITUDE | Unsigned Short | 2 | Gradient field containing an altitude value. |
| SPEED | Unsigned Short | 2 | Gradient field containing a speed or velocity value. |
| BEARING | Unsigned Short | 2 | Gradient field containing a compass bearing or course direction value. |
| DISTANCE | Unsigned Short | 2 | Gradient field containing a linear distance value. |

3. Constants

The following constant values are referenced in this document.

3.1 Transport Structure IDs

See section 5 Structure Summary.

3.2 Device Types

| Name | Value | Comment |
|---|---|---|
| DT_HERMES | 0x01 | Use for Hermes hardware specification devices. |
| DT_PPC | 0x02 | Use for Windows Pocket PC devices. |

3.3 GPS Fix States

| Name | Value | Comment |
|---|---|---|
| GPS_NOFIX | 0x01 | GPS is powered on but could not establish a fix. |
| GPS_SEARCHING | 0x02 | GPS is establishing a fix. |
| GPS_LOCONLY | 0x03 | GPS fix two dimensional without altitude. |
| GPS_LOCALT | 0x04 | GPS has a full three dimension fix with altitude. |
| GPS_POWEROFF | 0x05 | GPS is powered off. |

3.4 GPS Power States

| Name | Value | Comment |
|---|---|---|
| GPS_POWERDOWN | 0x01 | Power down the GPS. |
| GPS_POWERUP | 0x02 | Power up the GPS and attempt to obtain a fix. |
| GPS_POWERDOWNUNTIL | 0x03 | Power down until the wake up time. |

3.5 Interactivity Modes

| Name | Value | Comment |
|---|---|---|
| IMODE_HIGN | 0x01 | High Interactivity mode. |
| IMODE_LOW | 0x02 | Low Interactivity mode. |

3.6 Geofence Types

| Name | Value | Comment |
|---|---|---|
| GFT_INCLUSION | 0x01 | |
| GFT_EXCLUSION | 0x02 | |
| GFT_BOTH | 0x03 | |
| GFT_POLYGON | 0x04 | |
| GPT_CIRCULAR | 0x05 | |
| GFT_VELOCITY | 0x06 | |
| GFT_STATIONARY | 0x07 | |
| GFT_MOVEMENT | 0x08 | |

3.7 NACK Types

| Name | Value | Comment |
|---|---|---|
| NACK_UNKNOWN | 0x01 | |
| NACK_NOT_SUPPORTED | 0x02 | |
| NACK_FAIILED_CRC | 0x03 | |
| NACK_INVALID_LENGTH | 0x04 | |

4. Structure Summary

Utility structures are not included in the summary.

| Structure Name | Type | Manifest Value | Orientation Mobile to host | Orientation Host to Mobile | UDP | RHTTP | DHTTP | TCP | SMS |
|---|---|---|---|---|---|---|---|---|---|
| UDP_ENVELOPE | Transport | n.a. | ✓ | ✓ | ✓ | | | | |
| RHTTP_ENVELOPE | Transport | n.a. | ✓ | ✓ | | ✓ | | | |
| DHTTP_ENVELOPE | Transport | n.a. | ✓ | ✓ | | | ✓ | | |
| TCP_ENVELOPE | Transport | n.a. | ✓ | ✓ | | | | ✓ | |
| SMS_ENVELOPE | Transport | n.a. | ✓ | ✓ | | | | | ✓ |
| GET_DEVICE_ID | Request | 0x0101 | | ✓ | ✓ | ✓ | ✓ | ✓ | ✓ |
| GET_CURRENT_LOCATION | Request | 0x0102 | | ✓ | ✓ | ✓ | ✓ | ✓ | ✓ |
| GET_BATTERY_STATUS | Request | 0x0103 | | ✓ | ✓ | ✓ | ✓ | ✓ | ✓ |
| GET_RSSI | Request | 0x0104 | | ✓ | ✓ | ✓ | ✓ | ✓ | ✓ |
| GET_GPS_STATUS | Request | 0x0105 | | ✓ | ✓ | ✓ | ✓ | ✓ | ✓ |
| GET_GEOFENCE_HANDLE | Request | 0x0106 | ✓ | ✓ | ✓ | ✓ | ✓ | ✓ | ✓ |
| GET_GEOFENCES | Request | 0x0107 | | ✓ | ✓ | ✓ | ✓ | ✓ | ✓ |
| GET_CUSTOM_PARAM | Request | 0x0108 | | ✓ | ✓ | ✓ | ✓ | ✓ | ✓ |
| GET_DIAGNOSTIC | Request | 0x0109 | | ✓ | ✓ | ✓ | ✓ | ✓ | ✓ |
| GET_SYSTEMTIME | Request | 0x010A | ✓ | ✓ | ✓ | ✓ | ✓ | ✓ | ✓ |
| SET_REPORTING_INTERVAL | Request | 0x0201 | | ✓ | ✓ | ✓ | ✓ | ✓ | ✓ |
| SET_GPS_POWERSTATE | Request | 0x0202 | | ✓ | ✓ | ✓ | ✓ | ✓ | ✓ |
| SET_BUFFERING_INTERVAL | Request | 0x0203 | | ✓ | ✓ | ✓ | ✓ | ✓ | ✓ |
| SET_START_BUFFER | Request | 0x0204 | | ✓ | ✓ | ✓ | ✓ | ✓ | ✓ |
| SET_END_BUFFER | Request | 0x0205 | | ✓ | ✓ | ✓ | ✓ | ✓ | ✓ |
| SET_HEARTBEAT_PARAMETERS | Request | 0x0206 | | ✓ | | ✓ | | | |
| SET_INTERACTIVITY_MODE | Request | 0x0207 | | ✓ | | ✓ | | | ✓ |
| SET_CIRCULAR_GEOFENCE | Request | 0x0208 | | ✓ | ✓ | ✓ | ✓ | ✓ | ✓ |
| SET_POLYGON_GEOFENCE | Request | 0x0209 | | ✓ | ✓ | ✓ | ✓ | ✓ | ✓ |
| SET_VELOCITY_GEOFENCE | Request | 0x020A | | ✓ | ✓ | ✓ | ✓ | ✓ | ✓ |
| SET_STATIONARY_GEOFENCE | Request | 0x020B | | ✓ | ✓ | ✓ | ✓ | ✓ | ✓ |
| SET_DELETE_GEOFENCE | Request | 0x020C | | ✓ | ✓ | ✓ | ✓ | ✓ | ✓ |
| SET_CUSTOM_PARAM | Request | 0x020D | | ✓ | ✓ | ✓ | ✓ | ✓ | ✓ |
| SET_REPORTING_GRANULARITY | Request | 0x020E | | ✓ | ✓ | ✓ | ✓ | ✓ | ✓ |
| SET_MOVEMENT_GEOFENCE | Request | 0x020F | | ✓ | ✓ | ✓ | ✓ | ✓ | ✓ |
| SET_DIAGNOSTIC_INTERVAL | Request | 0x0210 | | ✓ | ✓ | ✓ | ✓ | ✓ | ✓ |
| SET_DEBUG_LEVEL | Request | 0x0211 | | ✓ | ✓ | ✓ | ✓ | ✓ | ✓ |
| PUT_CURRENT_LOCATION | Response | 0x0301 | ✓ | | ✓ | ✓ | ✓ | ✓ | ✓ |
| PUT_BATTERY_STATUS | Response | 0x0302 | ✓ | | ✓ | ✓ | ✓ | ✓ | ✓ |
| PUT_RSSI | Response | 0x0303 | ✓ | | ✓ | ✓ | ✓ | ✓ | ✓ |
| PUT_GPS_STATUS | Response | 0x0304 | ✓ | | ✓ | ✓ | ✓ | ✓ | ✓ |
| PUT_GEOFENCE_HANDLE | Response | 0x0305 | ✓ | | ✓ | ✓ | ✓ | ✓ | ✓ |
| PUT_GEOFENCE | Response | 0x0306 | ✓ | | ✓ | ✓ | ✓ | ✓ | ✓ |
| PUT_CUSTOM_PARAM | Response | 0x0307 | ✓ | | ✓ | ✓ | ✓ | ✓ | ✓ |
| PUT_LOCATION | Response | 0x0308 | ✓ | | ✓ | ✓ | ✓ | ✓ | ✓ |
| PUT_GEOFENCE_VIOLATION | Response | 0x0309 | ✓ | | ✓ | ✓ | ✓ | ✓ | ✓ |
| PUT_DEVICE_ID | Response | 0x030A | ✓ | | ✓ | ✓ | ✓ | ✓ | ✓ |
| PUT_LOCATION_ARRAY | Response | 0x030B | ✓ | | ✓ | ✓ | ✓ | ✓ | ✓ |
| PUT_DIAGNOSTIC | Response | 0x030C | ✓ | | ✓ | ✓ | ✓ | ✓ | ✓ |
| PUT_SYSTEMTIME | Response | 0x030D | | ✓ | ✓ | ✓ | ✓ | ✓ | ✓ |
| PUT_DEBUG_MESSAGE | Response | 0x030E | ✓ | | ✓ | ✓ | ✓ | ✓ | ✓ |
| ACK_MOBILE | Acknow. | 0x0401 | ✓ | | ✓ | ✓ | ✓ | ✓ | ✓ |
| ACK_HOST | Acknow. | 0x0402 | | ✓ | ✓ | ✓ | ✓ | ✓ | ✓ |
| NACK_MOBILE | Acknow. | 0x0403 | ✓ | | ✓ | ✓ | ✓ | ✓ | ✓ |
| NACK_HOST | Acknow. | 0x0404 | | ✓ | ✓ | ✓ | ✓ | ✓ | ✓ |

5. Utility Structures

5.1 Structure POSITION

POSITION defines a geographic position.

| Member Name | Data Type | Bytes | Comments |
|---|---|---|---|
| Latitude | LATITUDE | 4 | |
| Longitude | LONGITUDE | 4 | |
| TOTAL | | 8 | |

5.2 Structure CORNER

CORNER defines a corner of a polygon geofence.

| Member Name | Data Type | Bytes | Comments |
|---|---|---|---|
| Sequence Number | Byte | 1 | The number of the corner in clockwise sequence. |
| Position | POSITION | 8 | The geographic position of the corner. |
| TOTAL | | 9 | |

5.3 Structure LOCATE

LOCATE defines complete information about the device location in a moment in time.

| Member Name | Data Type | Bytes | Comments |
|---|---|---|---|
| Position | POSITION | 8 | Geographic position of the device. |
| Fix Time | DATETIME | 6 | Byte array [YMDHMS] |
| Fix Type | Byte | 1 | GPS Fix Type |
| Speed | SPEED | 2 | Speed gradient value |
| Bearing | BEARING | 2 | Bearing gradient value |
| Linear Motion | DISTANCE | 2 | Linear distance gradient value |
| Altitude | ALTITUDE | 2 | Altitude gradient value |
| TOTAL | | 22 | |

6. Transport Envelope Structures

Transport Envelopes contain transport-specific information necessary to ensure reliable deliver of information between host and mobile applications. Each transport has a specific transport envelope that all request and response transaction structures are encapsulated within.

6.1 Structure UDP_ENVELOPE

The UDP Transport Envelope is use to encase all UDP transport request and response structures.

| Member Name | Data Type | Bytes | Comments |
|---|---|---|---|
| Checksum | CRC32 | 4 | Checksum of the request/response structure using the CRC-32 algorithm. |
| SeqNo | Byte | 1 | Sequence Number. Increment with each NEW transmission. No carry. Use same SeqNo for retransmissions. |
| Payload Size | Unsigned Short | 2 | SizeOf(Payload) |
| Payload | Array of Byte | N | Contains the request or response structure being transported. |
| TOTAL | | N + 8 | |

6.2 Structure RHTTP_ENVELOPE

The Reverse HTTP Transport Envelope is use to encase all Reverse HTTP transport request and response structures.

6.2.1 Structure RHTTP_ENVELOPE

| Member Name | Data Type | Bytes | Comments |
|---|---|---|---|
| Timeout | Unsigned Short | 2 | The number of seconds the client will maintain the open HTTP request waiting for a response from the host. |
| Checksum | CRC32 | 4 | Checksum of the request/response structure using the CRC-32 algorithm. |
| Payload Size | Unsigned Short | 2 | SizeOf(Payload) |
| Payload | Array of Byte | N | Contains the request or response structure being transported. |
| TOTAL | | N + 8 | |

6.3 Structure DHTTP_ENVELOPE

The Direct HTTP Transport Envelope is use to encase all Direct HTTP transport request and response structures.

| Member Name | Data Type | Bytes | Comments |
|---|---|---|---|
| Checksum | CRC32 | 4 | Checksum of the request/response structure using the CRC-32 algorithm. |
| Payload Size | Unsigned Short | 2 | SizeOf(Payload) |
| Payload | Array of Byte | N | Contains the request or response structure being transported. |
| TOTAL | | N + 6 | |

6.4 Structure TCP_ENVELOPE

The TCP Transport Envelope is use to encase all TCP transport request and response structures.

| Member Name | Data Type | Bytes | Comments |
|---|---|---|---|
| Checksum | CRC32 | 4 | Checksum of the request/response structure using the CRC-32 algorithm. |
| Payload Size | Unsigned Short | 2 | SizeOf(Payload) |
| Payload | Array of byte | N | Contains the request or response structure being transported. |
| TOTAL | | N + 6 | |

6.5 Structure SMS_ENVELOPE

The SMS Transport Envelope is use to encase all SMS transport request and response structures.

| Member Name | Data Type | Bytes | Comments |
|---|---|---|---|
| Checksum | CRC32 | 4 | Checksum of the request/response structure using the CRC-32 algorithm. |
| Payload Size | Unsigned Short | 2 | SizeOf(Payload) |
| Payload | Array of Byte | N | Contains the request or response structure being transported. |
| TOTAL | | N + 8 | |

7. GET Request Structures

GET request structures can be used to initiate both host-to-mobile and mobile-to-host application-layer transactions. These requests contain a request for data, which is typically acknowledged by a corresponding PUT response structure containing the requested data.

7.1 Structure GET_DEVICE_ID

GET_DEVICE_ID is used by the device during first time initialization to obtain a unique device identifier from the GTX host platform. This unique device identifier is the primary method by which the device data is organized within the GTX platform. Most subsequent requests require a valid device identified as a structure member.

7.1.1 Protocol Usage

| UDP | Reverse HTTP | Direct HTTP | TCP | SMS |
|---|---|---|---|---|
| ✓ | ✓ | ✓ | ✓ | ✓ |

7.1.2 Request Orientation

| Mobile-to-host | Host-to-mobile |
|---|---|
| ✓ | |

7.1.3 Structure Definition

| Member Name | Data Type | Bytes | Comments |
|---|---|---|---|
| Structure ID | Unsigned Short | 2 | |
| Device SN | Array[1 ... 15] of byte | 15 | Contains a string representation of device IMEI (GSM) or MEID (CDMA). If the IMEI or ESN can not be obtained from the device, it is acceptable to submit the telephone number. This field is padded with nulls. (0x00). |
| Firmware Version | Float | 4 | Contains the firmware revision of the device expressed as a major version integer minor version fraction. |
| Device Type | Byte | 1 | Contains the device type constant. |
| TOTAL | | 22 | |

7.1.4 Expected Response

A properly formatted GET_DEVICE_ID request structure will be responded to from the host with a PUT_DEVICE_ID response structure.

7.2 Structure GET_CURRENT_LOCATION

GET_CURRENT_LOCATION is used by the host to request the most recent location coordinates from the mobile.

7.2.1 Protocol Usage

| UDP | Reverse HTTP | Direct HTTP | TCP | SMS |
|---|---|---|---|---|
| ✓ | ✓ | ✓ | ✓ | ✓ |

7.2.2 Request Orientation

| Mobile-to-host | Host-to-mobile |
|---|---|
| | ✓ |

7.2.3 Structure Definition

| Member Name | Data Type | Bytes | Comments |
|---|---|---|---|
| Structure ID | Unsigned Short | 2 | |
| TOTAL | | 2 | |

7.2.4 Expected Response

A properly formatted GET_CURRENT_LOCATION request structure will be responded to from the mobile with a PUT_CURRENT_LOCATION response structure.

7.3 Structure GET_BATTERY_STATUS

GET_BATTERY_STATUS is used by the host to request the current battery condition from the mobile.

7.3.1 Protocol Usage

| UDP | Reverse HTTP | Direct HTTP | TCP | SMS |
|---|---|---|---|---|
| ✓ | ✓ | ✓ | ✓ | ✓ |

7.3.2 Request Orientation

| Mobile-to-host | Host-to-mobile |
|---|---|
| | ✓ |

7.3.3 Structure Definition

| Member Name | Data Type | Bytes | Comments |
|---|---|---|---|
| Structure ID | Unsigned Short | 2 | |
| TOTAL | | 2 | |

7.3.4 Expected Response

A properly formatted GET_BATTERY_STATUS request structure will be responded to from the mobile with a PUT_BATTERY_STATUS response structure.

7.4 Structure GET_RSSI

GET_RSSI is used by the host to request the current radio signal strength condition from the mobile.

The mobile actually replies with and index value from 0 to 255 that hashes the actual measured signal quality.

The host calculates the actual signal quality value by referencing in a table containing domain parameters for this device type. The server stores the BASE value, the INCREMENT, an override value for transmitting the signal quality is UNKNOWN, and UNIT of measure field used for formatting the value for display.

If the server received value is equal to UNKNOWN, an undefined or unknown signal quality is calculated, otherwise the server calculates the signal quality value for by multiplying the received index by INCREMENT and adding the product to BASE.

7.4.1 Protocol Usage

| UDP | Reverse HTTP | Direct HTTP | TCP | SMS |
|---|---|---|---|---|
| ✓ | ✓ | ✓ | ✓ | ✓ |

7.4.2 Request Orientation

| Mobile-to-host | Host-to-mobile |
|---|---|
| | ✓ |

7.4.3 Structure Definition

| Member Name | Data Type | Bytes | Comments |
|---|---|---|---|
| Structure ID | Unsigned Short | 2 | |
| TOTAL | | 2 | |

7.4.4 Expected Response

A properly formatted GET_RSSI request structure will be responded to from the mobile with a PUT_RSSI response structure.

7.5 Structure GET_GPS_STATUS

GET_GPS_STATUS is used by the host to request the current condition of the GPS receiver from the mobile.

7.5.1 Protocol Usage

| UDP | Reverse HTTP | Direct HTTP | TCP | SMS |
|---|---|---|---|---|
| ✓ | ✓ | ✓ | ✓ | ✓ |

7.5.2 Request Orientation

| Mobile-to-host | Host-to-mobile |
|---|---|
| | ✓ |

7.5.3 Structure Definition

| Member Name | Data Type | Bytes | Comments |
|---|---|---|---|
| Structure ID | Unsigned Short | 2 | |
| TOTAL | | 2 | |

7.5.4 Expected Response

A properly formatted GET_GPS_STATUS request structure will be responded to from the mobile with a PUT_GPS_STATUS response structure.

7.6 Structure GET_GEOFENCE_HANDLE

GET_GEOFENCE_HANDLE is used by the host to request the handle for the next available geofence parameters storage area.

7.6.1 Protocol Usage

| UDP | Reverse HTTP | Direct HTTP | TCP | SMS |
|---|---|---|---|---|
| ✓ | ✓ | ✓ | ✓ | ✓ |

7.6.2 Request Orientation

| Mobile-to-host | Host-to-mobile |
|---|---|
| | ✓ |

7.6.3 Structure Definition

| Member Name | Data Type | Bytes | Comments |
|---|---|---|---|
| Structure ID | Unsigned Short | 2 | |
| Type | Byte | 1 | Geofence type |
| TOTAL | | 3 | |

7.6.4 Expected Response

The device must respond with a PUT_GEOFENCE_HANDLE transaction containing the handle to the available storage location, or a NACK if storage is full or the geofence type is unsupported.

7.7 Structure GET_GEOFENCES

GET_GEOFENCES is used by the host to request an iteration of the geofence parameter data currently stored on the device.

7.7.1 Protocol Usage

| UDP | Reverse HTTP | Direct HTTP | TCP | SMS |
|---|---|---|---|---|
| ✓ | ✓ | ✓ | ✓ | ✓ |

7.7.2 Request Orientation

| Mobile-to-host | Host-to-mobile |
|---|---|
| ✓ | ✓ |

7.7.3 Structure Definition

| Member Name | Data Type | Bytes | Comments |
|---|---|---|---|
| Structure ID | Unsigned Short | 2 | |
| TOTAL | | 2 | |

7.7.4 Expected Response

The device must respond iteratively with one PUT_GEOFENCE message for each set of geofence data currently stored. The device should NACK if not geofences are stored.

7.8 Structure GET_CUSTOM_PARAM

GET_CUSTOM_PARAM is used to query a custom parameter value, such as a carrier-specific connection parameter. The parameter name to query is specified in a variable length field. Up to 255 characters may be sent using this structure, however the response will be formatted as a string in NAME=VALUE format up to 255 bytes in length.

7.8.1 Protocol Usage

| UDP | Reverse HTTP | Direct HTTP | TCP | SMS |
|---|---|---|---|---|
| ✓ | ✓ | ✓ | ✓ | ✓ |

7.8.2 Request Orientation

| Mobile-to-host | Host-to-mobile |
|---|---|
|  | ✓ |

7.8.3 Structure Definition

| Member Name | Data Type | Bytes | Comments |
|---|---|---|---|
| Structure ID | Unsigned Short | 2 | |
| BufferLen | Byte | 1 | SizeOf(Buffer) |
| Buffer | Array[1 ... BufferLen] of Byte | N | NAME part of NAME = VALUE parameter format. |
| TOTAL | | N + 3 | |

7.8.4 Expected Response

A properly formatted GET_CUSTOM_PARAM should be acknowledged with a PUT_CUSTOM_PARAM structure containing the response in NAME=VALUE format.

7.9 Structure GET_DIAGNOSTIC

GET_DIAGNOSTIC is used to make a one-time request for a complete diagnostic payload. Use SET_DIAGNOSTIC_INTERVAL to establish periodic reporting of the diagnostics by the device.

7.9.1 Protocol Usage

| UDP | Reverse HTTP | Direct HTTP | TCP | SMS |
|---|---|---|---|---|
| ✓ | ✓ | ✓ | ✓ | ✓ |

7.9.2 Request Orientation

| Mobile-to-host | Host-to-mobile |
|---|---|
|  | ✓ |

7.9.3 Structure Definition

| Member Name | Data Type | Bytes | Comments |
|---|---|---|---|
| Structure ID | Unsigned Short | 2 | |
| TOTAL | | 2 | |

7.9.4 Expected Response

A properly formatted GET_DIAGNOSTIC should be acknowledged with a PUT_DIAGNOSTIC structure.

7.10 Structure GET_SYSTEMTIME

GET_SYSTEMTIME is used to request the current UTC date and time at the host.

7.10.1 Protocol Usage

| UDP | Reverse HTTP | Direct HTTP | TCP | SMS |
|---|---|---|---|---|
| ✓ | ✓ | ✓ | ✓ | ✓ |

7.10.2 Request Orientation

| Mobile-to-host | Host-to-mobile |
|---|---|
|  | ✓ |

7.10.3 Structure Definition

| Member Name | Data Type | Bytes | Comments |
|---|---|---|---|
| Structure ID | Unsigned Short | 2 | |
| TOTAL | | 2 | |

7.10.4 Expected Response

A properly formatted GET_SYSTEMTIME should be acknowledged with a PUT_SYSTEMTIME structure.

8. SET Request Structures

SET request structures are used to initiate both host-to-mobile and mobile-to-host application-layer transactions. These structures contain a command to alter the system running state or modify an internal parameters or values. SET requests are typically confirmed with a generic acknowledgement.

8.1 Structure SET_REPORTING_INTERVAL

SET_REPORTING_INTERVAL is used by the host to set the autonomous location report interval. When the reporting interval is set to a non-zero value, the mobile report automatically transmits asynchronous PUT_LOCATION structures according to the set interval.

8.1.1 Protocol Usage

| UDP | Reverse HTTP | Direct HTTP | TCP | SMS |
|---|---|---|---|---|
| ✓ | ✓ | ✓ | ✓ | ✓ |

8.1.2 Request Orientation

| Mobile-to-host | Host-to-mobile |
|---|---|
|  | ✓ |

8.1.3 Structure Definition

| Member Name | Data Type | Bytes | Comments |
|---|---|---|---|
| Structure ID | Unsigned Short | 2 | |
| Min Interval | Unsigned Short | 2 | Minimum reporting interval in seconds. Set to Zero to turn off autonomous reporting. Reports will be sent NOT MORE often then this, regardless of the distance trigger. |

-continued

| Member Name | Data Type | Bytes | Comments |
|---|---|---|---|
| Max Interval | Unsigned Short | 2 | Maximum reporting interval in seconds. Set to Zero to turn off autonomous reporting. Reports will be sent AT LEAST this often, if the distance trigger is not met. |
| Linear Distance Trigger | DISTANCE | 2 | Distance reporting trigger gradient. Reports will be sent when this accumulated distance is traveled. |
| TOTAL | | 8 | |

8.1.4 Expected Response

A properly formatted SET_REPORTING_INTERVAL should be acknowledged with a ACK_MOBILE structure with the Acknowledgement field set to SET_REPORTING_INTERVAL.

8.2 Structure SET_GPS_POWERSTATE

SET_GPS_POWERSTATE is used by the host to set the power state of the GPS receiver.

8.2.1 Protocol Usage

| UDP | Reverse HTTP | Direct HTTP | TCP | SMS |
|---|---|---|---|---|
| ✓ | ✓ | ✓ | ✓ | ✓ |

8.2.2 Request Orientation

| Mobile-to-host | Host-to-mobile |
|---|---|
| | ✓ |

8.2.3 Structure Definition

| Member Name | Data Type | Bytes | Comments |
|---|---|---|---|
| Structure ID | Unsigned Short | 2 | |
| New Power State | Byte | 1 | One of the GPS Power State Constants. |
| Wakeup | DATETIME | 6 | If the power state is being set to GPS_POWERDOWNUNTIL, this field specifies that date and time to power back up. |
| TOTAL | | 9 | |

8.2.4 Expected Response

A properly formatted SET_GPS_POWERSTATE should be acknowledged with a ACK_MOBILE structure with the Acknowledgement field set to SET_GPS_POWERSTATE.

8.3 Structure SET_BUFFERING_INTERVAL

SET_BUFFERING_INTERVAL is used by the host to set the local location buffering interval. The buffering interval controls how frequently location records will be stored in the device memory in the event of a temporary out-of-coverage condition. The buffer is implemented as a circular queue. When the allocated storage for the buffer is used, new entries overwrite the oldest entry in the buffer.

8.3.1 Protocol Usage

| UDP | Reverse HTTP | Direct HTTP | TCP | SMS |
|---|---|---|---|---|
| ✓ | ✓ | ✓ | ✓ | ✓ |

8.3.2 Request Orientation

| Mobile-to-host | Host-to-mobile |
|---|---|
| | ✓ |

8.3.3 Structure Definition

| Member Name | Data Type | Bytes | Comments |
|---|---|---|---|
| Structure ID | Unsigned Short | 2 | |
| Min Interval | Unsigned Short | 2 | Minimum reporting interval in seconds. Set to Zero to turn off autonomous reporting. Locates will be buffered NOT MORE often then this, regardless of the distance trigger. |
| Max Interval | Unsigned Short | 2 | Maximum reporting interval in seconds. Set to Zero to turn off autonomous reporting. Locates will be buffered AT LEAST this often, if the distance trigger is not met. |
| Linear Distance Trigger | DISTANCE | 2 | Distance reporting trigger gradient. Locates will be buffered when this accumulated distance is traveled. |
| TOTAL | | 8 | |

8.3.4 Expected Response

A properly formatted SET_BUFFERING_INTERVAL should be acknowledged with an ACK_MOBILE structure with the Acknowledgement field set to SET_BUFFERING_INTERVAL.

8.4 Structure SET_START_BUFFER

SET_START_BUFFER starts a dump of the current location buffer from the mobile to the host. When the mobile receives a request to start sending buffered data, it will begin traversing the circular queue starting with the oldest record, sending each record to the host using a PUT_LOCATION structure. Reporting stops when a SET_END_BUFFER request is received, or when the newest buffered data has been transmitted.

8.4.1 Protocol Usage

| UDP | Reverse HTTP | Direct HTTP | TCP | SMS |
|---|---|---|---|---|
| ✓ | ✓ | ✓ | ✓ | ✓ |

8.4.2 Request Orientation

| Mobile-to-host | Host-to-mobile |
|---|---|
|  | ✓ |

8.4.3 Structure Definition

| Member Name | Data Type | Bytes | Comments |
|---|---|---|---|
| Structure ID | Unsigned Short | 2 | |
| TOTAL | | 3 | |

8.4.4 Expected Response

A properly formatted SET_START_BUFFER structure should be acknowledged with a PUT_LOCATION structure containing the oldest record in the buffer.

8.5 Structure SET_END_BUFFER

SET_END_BUFFER stops a dump of the location buffer from the mobile.

8.5.1 Protocol Usage

| UDP | Reverse HTTP | Direct HTTP | TCP | SMS |
|---|---|---|---|---|
| ✓ | ✓ | ✓ | ✓ | ✓ |

8.5.2 Request Orientation

| Mobile-to-host | Host-to-mobile |
|---|---|
|  | ✓ |

8.5.3 Structure Definition

| Member Name | Data Type | Bytes | Comments |
|---|---|---|---|
| Structure ID | Unsigned Short | 2 | |
| TOTAL | | 2 | |

8.5.4 Expected Response

A properly formatted SET_END_BUFFER should be acknowledged with a ACK_MOBILE structure with the Acknowledgement field set to SET_END_BUFFER.

8.6 Structure SET_HEARTBEAT_PARAMETERS

SET_HEARTBEAT_PARAMETERS is used to set the starting parameters for the HTTP session timeout for the Reverse HTTP Transport.

8.6.1 Protocol Usage

| UDP | Reverse HTTP | Direct HTTP | TCP | SMS |
|---|---|---|---|---|
|  | ✓ | | | |

8.6.2 Request Orientation

| Mobile-to-host | Host-to-mobile |
|---|---|
|  | ✓ |

8.6.3 Structure Definition

| Member Name | Data Type | Bytes | Comments |
|---|---|---|---|
| Structure ID | Unsigned Short | 2 | |
| Starting Interval | Unsigned Short | 2 | Starting interval in seconds. |
| Step Interval | Unsigned Short | 2 | The amount to add or subtract from the timeout after a successful session or a timeout. |
| Interval Limit | Unsigned Short | 2 | The longest timeout interval the system will seek to, in seconds. |
| TOTAL | | 8 | |

8.6.4 Expected Response

A properly formatted SET_HEARTBEAT_INTERVAL should be acknowledged with an ACK_MOBILE structure with the Acknowledgement field set to SET_HEARTBEAT_INTERVAL.

8.7 Structure SET_INTERACTIVITY_MODE

SET_INTERACTIVITY_MODE is used to set the toggle between High Interactivity and Low Interactive Mode for Reverse HTTP Transport devices.

When this command is sent via SMS, it still applies to the devices Reverse HTTP Transport mode. In this case, it is used as an out-of-band signal to switch to High Interactivity mode and force immediate Reverse HTTP session establishment.

8.7.1 Protocol Usage

| UDP | Reverse HTTP | Direct HTTP | TCP | SMS |
|---|---|---|---|---|
|  | ✓ | | | ✓ |

8.7.2 Request Orientation

| Mobile-to-host | Host-to-mobile |
|---|---|
|  | ✓ |

8.7.3 Structure Definition

| Member Name | Data Type | Bytes | Comments |
|---|---|---|---|
| Structure ID | Unsigned Short | 2 | |
| Interactivity Mode | Byte | 1 | One of the Interactivity Mode constants. |
| Polling Rate | Unsigned Short | 2 | For Low Interactivity mode, this sets the polling rate in seconds. |
| TOTAL | | 8 | |

8.7.4 Expected Response

A properly formatted SET_INTERACTIVITY_MODE should be acknowledged with an ACK_MOBILE structure with the Acknowledgement field set to SET_INTERACTIVITY_MODE.

8.8 Structure SET_CIRCULAR_GEOFENCE

SET_CIRCULAR_GEOFENCE is used to create a circular area which the device to generate alerts if the area in entered or exited.

8.8.1 Protocol Usage

| UDP | Reverse HTTP | Direct HTTP | TCP | SMS |
|---|---|---|---|---|
| ✓ | ✓ | ✓ | ✓ | ✓ |

8.8.2 Request Orientation

| Mobile-to-host | Host-to-mobile |
|---|---|
|  | ✓ |

8.8.3 Structure Definition

| Member Name | Data Type | Bytes | Comments |
|---|---|---|---|
| Structure ID | Unsigned Short | 2 |  |
| Handle | Byte | 1 |  |
| Center | POSITION | 8 |  |
| Radius | DISTANCE | 2 | Distance gradient value |
| Type | Byte | 1 | GFT_INCLUSION GFT_EXCLUSION GFT_BOTH |
| TOTAL |  | 16 |  |

8.8.4 Expected Response

ACK is the device accepts the geofence, NACK if the handle is invalid or the geofence type is unsupported.

8.9 Structure SET_POLYGON_GEOFENCE

SET_CIRCULAR_GEOFENCE is used to create a rectangular area which the device will generate alerts if the area in entered or exited.

8.9.1 Protocol Usage

| UDP | Reverse HTTP | Direct HTTP | TCP | SMS |
|---|---|---|---|---|
| ✓ | ✓ | ✓ | ✓ | ✓ |

8.9.2 Request Orientation

| Mobile-to-host | Host-to-mobile |
|---|---|
|  | ✓ |

8.9.3 Structure Definition

| Member Name | Data Type | Bytes | Comments |
|---|---|---|---|
| Structure ID | Unsigned Short | 2 |  |
| Handle | Byte | 1 |  |
| Corner Count | Byte | 1 |  |
| Corners | Array[1 ... Corner Count] of CORNER | N * 8 |  |
| Type | Byte | 1 | GFT_INCLUSION GFT_EXCLUSION GFT_BOTH |
| TOTAL |  | N * 8 + 5 |  |

8.9.4 Expected Response

ACK is the device accepts the geofence, NACK if the handle is invalid or the geofence type is unsupported.

8.10 Structure SET_VELOCITY_GEOFENCE

SET_CIRCULAR_GEOFENCE is used to create a threshold speed which the device will generate alerts if the threshold is exceeded.

8.10.1 Protocol Usage

| UDP | Reverse HTTP | Direct HTTP | TCP | SMS |
|---|---|---|---|---|
| ✓ | ✓ | ✓ | ✓ | ✓ |

8.10.2 Request Orientation

| Mobile-to-host | Host-to-mobile |
|---|---|
|  | ✓ |

8.10.3 Structure Definition

| Member Name | Data Type | Bytes | Comments |
|---|---|---|---|
| Structure ID | Unsigned Short | 2 |  |
| Handle | Byte | 1 |  |
| Speed | SPEED | 2 | Speed gradient value |
| TOTAL |  | 11 |  |

8.10.4 Expected Response

ACK is the device accepts the geofence, NACK if the handle is invalid or the geofence type is unsupported.

8.11 Structure SET_STATIONARY_GEOFENCE

SET_STATIONARY_GEOFENCE is used to create a threshold period of time which the device will generate alerts if it is stationary for a period of time greater than the threshold.

8.11.1 Protocol Usage

| UDP | Reverse HTTP | Direct HTTP | TCP | SMS |
|---|---|---|---|---|
| ✓ | ✓ | ✓ | ✓ | ✓ |

8.11.2 Request Orientation

| Mobile-to-host | Host-to-mobile |
|---|---|
|  | ✓ |

8.11.3 Structure Definition

| Member Name | Data Type | Bytes | Comments |
|---|---|---|---|
| Structure ID | Unsigned Short | 2 | |
| Handle | Byte | 1 | |
| Trigger Speed | SPEED | 2 | Speed gradient value |
| Time at Rest | DATETIME | 6 | |
| TOTAL | | 13 | |

8.11.4 Expected Response

ACK is the device accepts the geofence, NACK if the handle is invalid or the geofence type is unsupported.

8.12 Structure SET_DELETE_GEOFENCE

SET_DELETE_GEOFENCE is used to delete the parameters associated with a particular geofence and suppress alerting based on those parameters.

8.12.1 Protocol Usage

| UDP | Reverse HTTP | Direct HTTP | TCP | SMS |
|---|---|---|---|---|
| ✓ | ✓ | ✓ | ✓ | ✓ |

8.12.2 Request Orientation

| Mobile-to-host | Host-to-mobile |
|---|---|
| | ✓ |

8.12.3 Structure Definition

| Member Name | Data Type | Bytes | Comments |
|---|---|---|---|
| Structure ID | Unsigned Short | 2 | |
| Handle | Byte | 1 | |
| TOTAL | | 3 | |

8.12.4 Expected Response

ACK is the geofence could be deleted, NACK if the handle is invalid.

8.13 Structure SET_CUSTOM_PARAM

SET_CUSTOM_PARAM is used to set a custom parameter, such as a carrier-specific connection parameter. The parameter is specified in a variable length field in NAME=VALUE format. Up to 255 characters may be sent using this structure.

8.13.1 Protocol Usage

| UDP | Reverse HTTP | Direct HTTP | TCP | SMS |
|---|---|---|---|---|
| ✓ | ✓ | ✓ | ✓ | ✓ |

8.13.2 Request Orientation

| Mobile-to-host | Host-to-mobile |
|---|---|
| | ✓ |

8.13.3 Structure Definition

| Member Name | Data Type | Bytes | Comments |
|---|---|---|---|
| Structure ID | Unsigned Short | 2 | |
| BufferLen | Byte | 1 | SizeOf(Buffer) |
| Buffer | Array[1 . . . BufferLen] of Byte | N | Parameter in NAME = VALUE format. |
| TOTAL | | N + 3 | |

8.13.4 Expected Response

A properly formatted SET_CUSTOM_PARAM should be acknowledged with an ACK_MOBILE structure with the Acknowledgement field set to SET_CUSTOM_PARAM.

8.14 Structure SET_REPORTING_GRANULARITY

SET_REPORTING_GRANULARITY is used to set the threshold distance between internal location samples. When a reporting granularity value is set, the device will not accumulate inter-sample distances below the set distance. This is designed to dampen phantom location "drift" generated by a stationary device.

8.14.1 Protocol Usage

| UDP | Reverse HTTP | Direct HTTP | TCP | SMS |
|---|---|---|---|---|
| ✓ | ✓ | ✓ | ✓ | ✓ |

8.14.2 Request Orientation

| Mobile-to-host | Host-to-mobile |
|---|---|
| | ✓ |

8.14.3 Structure Definition

| Member Name | Data Type | Bytes | Comments |
|---|---|---|---|
| Structure ID | Unsigned Short | 2 | |
| Distance | DISTANCE | 2 | Distance gradient value |
| TOTAL | | 4 | |

8.14.4 Expected Response

A properly formatted SET_REPORTING_GRANULARITY should be acknowledged with a ACK_MOBILE structure with the Acknowledgement field set to SET_REPORTING_GRANULARITY.

8.15 Structure SET MOVEMENT_GEOFENCE_MOVEMENT_GEOFENCE

SET_MOVEMENT_GEOFENCE is used to create a threshold distance which the device to generate alerts if that distance is traveled. This is different than setting reporting based on distance because when a movement geofence is set, the device will report PUT_GEOFENCE_VIOLATION when the distance has been traveled.

8.15.1 Protocol Usage

| UDP | Reverse HTTP | Direct HTTP | TCP | SMS |
|---|---|---|---|---|
| ✓ | ✓ | ✓ | ✓ | ✓ |

8.15.2 Request Orientation

| Mobile-to-host | Host-to-mobile |
|---|---|
|  | ✓ |

8.15.3 Structure Definition

| Member Name | Data Type | Bytes | Comments |
|---|---|---|---|
| Structure ID | Unsigned Short | 2 |  |
| Handle | Byte | 1 |  |
| Trigger Distance | DISTANCE | 2 | Distance gradient value |
| TOTAL |  | 11 |  |

8.15.4 Expected Response

ACK is the device accepts the geofence, NACK if the handle is invalid or the geofence type is unsupported.

8.16 Structure SET_DIAGNOSTIC_INTERVAL

SET_DIAGNOSTIC_INTERVAL is used by the host to set the request periodic diagnostic payload reporting. When the reporting interval is set to a non-zero value, the mobile automatically transmits asynchronous PUT_DIAGNOSTIC structures according to the set interval.

8.16.1 Protocol Usage

| UDP | Reverse HTTP | Direct HTTP | TCP | SMS |
|---|---|---|---|---|
| ✓ | ✓ | ✓ | ✓ | ✓ |

8.16.2 Request Orientation

| Mobile-to-host | Host-to-mobile |
|---|---|
|  | ✓ |

8.16.3 Structure Definition

| Member Name | Data Type | Bytes | Comments |
|---|---|---|---|
| Structure ID | Unsigned Short | 2 |  |
| Min Interval | Unsigned Short | 2 | Minimum reporting interval in seconds. Set to Zero to turn off autonomous reporting. Reports will be sent NOT MORE often then this, regardless of the distance trigger. |
| Max Interval | Unsigned Short | 2 | Maximum reporting interval in seconds. Set to Zero to turn off autonomous reporting. Reports will be sent AT LEAST this often, if the distance trigger is not met. |
| Linear Distance Trigger | DISTANCE | 2 | Distance reporting trigger gradient. Reports will be sent when this accumulated distance is traveled. |
| TOTAL |  | 8 |  |

8.16.4 Expected Response

A properly formatted SET_DIAGNOSTIC_INTERVAL should be acknowledged with a ACK_MOBILE structure with the Acknowledgement field set to SET_DIAGNOSTIC_INTERVAL.

8.17 Structure SET_DEBUG_LEVEL

SET_DEBUG_LEVEL is used by the host to set the debug reporting level for the device. Debug level 0 turns off reporting. Other levels are firmware defined. Protocol Usage

| UDP | Reverse HTTP | Direct HTTP | TCP | SMS |
|---|---|---|---|---|
| ✓ | ✓ | ✓ | ✓ | ✓ |

8.17.1 Request Orientation

| Mobile-to-host | Host-to-mobile |
|---|---|
|  | ✓ |

8.17.2 Structure Definition

| Member Name | Data Type | Bytes | Comments |
|---|---|---|---|
| Structure ID | Unsigned Short | 2 |  |
| Debug Level | Byte | 1 |  |
| TOTAL |  | 3 |  |

8.17.3 Expected Response

A properly formatted SET_DEBUG_LEVEL should be acknowledged with a ACK_MOBILE structure with the Acknowledgement field set to SET_DEBUG_LEVEL.

9. PUT Response Structures

PUT Request structures are used to acknowledge host-to-mobile and mobile-to-host application-layer transactions. These structures typically contain a response to a GET request.

PUT requests may also be used to asynchronously deliver event notifications. When delivering an asynchronous notification, they may be confirmed with a generic acknowledgement.

9.1 Structure PUT_CURRENT_LOCATION

PUT_CURRENT_LOCATION is used to respond to and acknowledge a GET_CURRENT_LOCATION request.

9.1.1 Protocol Usage

| UDP | Reverse HTTP | Direct HTTP | TCP | SMS |
|---|---|---|---|---|
| ✓ | ✓ | ✓ | ✓ | ✓ |

9.1.2 Orientation

| Mobile-to-host | Host-to-mobile |
|---|---|
| ✓ | |

9.1.3 Structure Definition

| Member Name | Data Type | Bytes | Comments |
|---|---|---|---|
| Structure ID | Unsigned Short | 2 | |
| Device ID | Unsigned Integer | 4 | Device ID returned in the PUT_DEVICE_ID response. |
| Location | LOCATE | 22 | |
| TOTAL | | 28 | |

9.2 Structure PUT_BATTERY_STATUS

PUT_BATTERY_STATUS is used to respond to and acknowledge a GET_BATTERY_STATUS request.

9.2.1 Protocol Usage

| UDP | Reverse HTTP | Direct HTTP | TCP | SMS |
|---|---|---|---|---|
| ✓ | ✓ | ✓ | ✓ | ✓ |

9.2.2 Orientation

| Mobile-to-host | Host-to-mobile |
|---|---|
| ✓ | |

9.2.3 Structure Definition

| Member Name | Data Type | Bytes | Comments |
|---|---|---|---|
| Structure ID | Unsigned Short | 2 | |
| Device ID | Unsigned Integer | 4 | Device ID returned in the PUT_DEVICE_ID response. |
| Battery Level | BATLEVEL | 4 | |
| TOTAL | | 10 | |

9.3 Structure PUT_RSSI

PUT_RSSI is used to respond to and acknowledge a GET_RSSI request.

The mobile actually replies with and index value from 0 to 255 that hashes the actual measured signal quality.

The host calculates the actual signal quality value by referencing in a table containing domain parameters for this device type. The server stores the BASE value, the INCREMENT, an override value for transmitting the signal quality is UNKNOWN, and UNIT of measure field used for formatting the value for display.

If the server receives value is equal to UNKNOWN, an undefined or unknown signal quality is calculated, otherwise the server calculates the signal quality value for by multiplying the received index by INCREMENT and adding the product to BASE.

9.3.1 Protocol Usage

| UDP | Reverse HTTP | Direct HTTP | TCP | SMS |
|---|---|---|---|---|
| ✓ | ✓ | ✓ | ✓ | ✓ |

9.3.2 Orientation

| Mobile-to-host | Host-to-mobile |
|---|---|
| ✓ | |

9.3.3 Structure Definition

| Member Name | Data Type | Bytes | Comments |
|---|---|---|---|
| Structure ID | Unsigned Short | 2 | |
| Device ID | Unsigned Integer | 4 | Device ID returned in the PUT_DEVICE_ID response. |
| Radio Signal Strength | RSSI | 1 | |
| TOTAL | | 7 | |

9.4 Structure PUT_GPS_STATUS

PUT_GPS_STATUS is used to respond to and acknowledge a GET_GPS_STATUS request.

9.4.1 Protocol Usage

| UDP | Reverse HTTP | Direct HTTP | TCP | SMS |
|---|---|---|---|---|
| ✓ | ✓ | ✓ | ✓ | ✓ |

9.4.2 Orientation

| Mobile-to-host | Host-to-mobile |
|---|---|
| ✓ | |

9.4.3 Structure Definition

| Member Name | Data Type | Bytes | Comments |
|---|---|---|---|
| Structure ID | Unsigned Short | 2 | |
| Device ID | Unsigned Integer | 4 | Device ID returned in the PUT_DEVICE_ID response. |
| Fix Type | Byte | 1 | One of the GPS Fix State constants. |
| Satellites | Byte | 1 | Number of satellites in view of the receiver. |

-continued

| Member Name | Data Type | Bytes | Comments |
|---|---|---|---|
| DOP | Byte | 1 | Gradient; Dilution of Precision from the GPS, if available. |
| VDOP | Byte | 1 | Gradient; Vertical Dilution of Precision from the GPS, if available. |
| HDOP | Byte | 1 | Gradient; Horizontal Dilution of Precision from the GPS, if available. |
| Accuracy | Byte | 1 | Accuracy in meters. 255 is used for anything greater than 254. |
| TOTAL | | 11 | |

9.5 Structure PUT_GEOFENCE_HANDLE

The device responds to a GET_GEOFENCE_HANDLE message with PUT_GEOFENCE_HANDLE. After retrieving the handle, the host can set a geofence using the supplied handle.

9.5.1 Protocol Usage

| UDP | Reverse HTTP | Direct HTTP | TCP | SMS |
|---|---|---|---|---|
| ✓ | ✓ | ✓ | ✓ | ✓ |

9.5.2 Request Orientation

| Mobile-to-host | Host-to-mobile |
|---|---|
| ✓ | |

9.5.3 Structure Definition

| Member Name | Data Type | Bytes | Comments |
|---|---|---|---|
| Structure ID | Unsigned Short | 2 | |
| Device ID | Unsigned Integer | 4 | Device ID returned in the PUT_DEVICE_ID response. |
| Handle | Byte | 1 | |
| TOTAL | | 7 | |

9.5.4 Expected Response

The host should transmit a desired geofence message type using the supplied handle.

9.6 Structure PUT_GEOFENCE

PUT_GEOFENSE is used by the device to transmit the parameters of a particular geofence. PUT_GEOFENCE could used in response to a require for a specific geofence's parameters, or PUT_GEOFENCE could be transmitted iteratively for each stored geofence in response to GET_GEOFENSES.

9.6.1 Protocol Usage

| UDP | Reverse HTTP | Direct HTTP | TCP | SMS |
|---|---|---|---|---|
| ✓ | ✓ | ✓ | ✓ | ✓ |

9.6.2 Request Orientation

| Mobile-to-host | Host-to-mobile |
|---|---|
| | ✓ |

9.6.3 Structure Definition

| Member Name | Data Type | Bytes | Comments |
|---|---|---|---|
| Structure ID | Unsigned Short | 2 | |
| Device ID | Unsigned Integer | 4 | |
| Handle | Byte | 1 | |
| Type | Byte | 1 | Geofence type |
| Radius | Unsigned Integer | 4 | |
| Corner Count | Byte | 1 | |
| Corners | Array[1 ... Corner Count] of CORNER | N * 9 | |
| TOTAL | | N * 9 + 13 | |

9.7 Structure PUT_CUSTOM_PARAM

PUT_CUSTOM_PARAM is used to respond to a GET_CUSTOM_PARAM structure with the value of a custom parameter, such as a carrier-specific connection parameter. The response is formatted in a variable length field in NAME=VALUE format. Up to 255 characters may be sent using this structure.

9.7.1 Protocol Usage

| UDP | Reverse HTTP | Direct HTTP | TCP | SMS |
|---|---|---|---|---|
| ✓ | ✓ | ✓ | ✓ | ✓ |

9.7.2 Request Orientation

| Mobile-to-host | Host-to-mobile |
|---|---|
| | ✓ |

9.7.3 Structure Definition

| Member Name | Data Type | Bytes | Comments |
|---|---|---|---|
| Structure ID | Unsigned Short | 2 | |
| Device ID | Unsigned Integer | 4 | Device ID returned in the PUT_DEVICE_ID response. |
| BufferLen | Byte | 1 | SizeOf(Buffer) |
| Buffer | Array[1 ... BufferLen] of Byte | N | Parameter in NAME = VALUE format. |
| TOTAL | | N + 7 | |

9.8 Structure PUT_LOCATION

PUT_LOCATION is used to send an unacknowledged coordinate fix from the mobile to the host. This coordinate fix may be initiated by a request from the host to begin autonomous interval reporting, or to stream buffered location data in response to a request from the host to dump the buffer, or may be initiated by the device after a back-in-cellular-coverage condition.

9.8.1 Protocol Usage

| UDP | Reverse HTTP | Direct HTTP | TCP | SMS |
|---|---|---|---|---|
| ✓ | ✓ | ✓ | ✓ | ✓ |

9.8.2 Orientation

| Mobile-to-host | Host-to-mobile |
|---|---|
| ✓ | |

9.8.3 Structure Definition

| Member Name | Data Type | Bytes | Comments |
|---|---|---|---|
| Structure ID | Unsigned Short | 2 | |
| Device ID | Unsigned Integer | 4 | Device ID returned in the PUT_DEVICE_ID response |
| Location | LOCATE | 22 | |
| TOTAL | | 28 | |

9.9 Structure PUT_GEOFENCE_VIOLATION

PUT_GEOFENCE_VIOLATION is used to signal that a geofence boundary has been crossed or a threshold has been exceeded.

9.9.1 Protocol Usage

| UDP | Reverse HTTP | Direct HTTP | TCP | SMS |
|---|---|---|---|---|
| ✓ | ✓ | ✓ | ✓ | ✓ |

9.9.2 Orientation

| Mobile-to-host | Host-to-mobile |
|---|---|
| ✓ | |

9.9.3 Structure Definition

| Member Name | Data Type | Bytes | Comments |
|---|---|---|---|
| Structure ID | Unsigned Short | 2 | |
| Device ID | Unsigned Integer | 4 | Device ID returned in the PUT_DEVICE_ID response. |
| Handle | Byte | 1 | Geofence Handle |
| Location | LOCATE | 22 | |
| TOTAL | | 29 | |

9.10 Structure PUT_DEVICE_ID

PUT_DEVICE_ID is send by the host in response to a GET_DEVICE_ID request structure.

9.10.1 Protocol Usage

| UDP | Reverse HTTP | Direct HTTP | TCP | SMS |
|---|---|---|---|---|
| ✓ | ✓ | ✓ | ✓ | ✓ |

9.10.2 Request Orientation

| Mobile-to-host | Host-to-mobile |
|---|---|
| | ✓ |

9.10.3 Structure Definition

| Member Name | Data Type | Bytes | Comments |
|---|---|---|---|
| Structure ID | Unsigned Short | 2 | |
| Device ID | Unsigned Integer | 4 | |
| TOTAL | | 6 | |

9.11 Structure PUT_LOCATION_ARRAY

PUT_LOCATION_ARRAY is used to send multiple coordinate fixes from the mobile to the host. This may be initiated by a request from the host to begin to stream buffered location data in response to a request from the host to dump the buffer, or may be initiated by the device after a back-in-cellular-coverage condition.

PUT_LOCATION_ARRAY should be used whenever more than one buffered locate record is being set to the host. The maximum number of locates that can be passed in the array is 255, but implementation limitations such as maximum transport payload may significantly limit this number. It is the developer's responsibility to insure that a structure small enough to be supported by the transport layer is created.

9.11.1 Protocol Usage

| UDP | Reverse HTTP | Direct HTTP | TCP | SMS |
|---|---|---|---|---|
| ✓ | ✓ | ✓ | ✓ | ✓ |

9.11.2 Orientation

| Mobile-to-host | Host-to-mobile |
|---|---|
| ✓ | |

9.11.3 Structure Definition

| Member Name | Data Type | Bytes | Comments |
|---|---|---|---|
| Structure ID | Unsigned Short | 2 | |
| Device ID | Unsigned Integer | 4 | Device ID returned in the PUT_DEVICE_ID response |
| Array Size | Byte | 1 | Number of LOCATE elements in the array |
| Locations | Array[1 . . . Array Size] of LOCATE | N * 22 | |

| Member Name | Data Type | Bytes | Comments |
|---|---|---|---|
| TOTAL | | 7 + (N * 22) | |

9.11.4 Expected Response

Because of the relatively large amount of data carried in a PUT_LOCATION_ARRAY structure, it should be acknowledged with an ACK_HOST structure with the Acknowledgement field set to PUT_LOCATION_ARRAY.

9.12 Structure PUT_DIAGNOSTIC

PUT_DIAGNOSTIC is used to respond to and acknowledge a GET_DIAGNOSTIC request and to send periodic diagnostic payloads if requested by SET_DIAGNOSTIC_INTERVAL.

9.12.1 Protocol Usage

| UDP | Reverse HTTP | Direct HTTP | TCP | SMS |
|---|---|---|---|---|
| ✓ | ✓ | ✓ | ✓ | ✓ |

9.12.2 Orientation

| Mobile-to-host | Host-to-mobile |
|---|---|
| ✓ | |

9.12.3 Structure Definition

| Member Name | Data Type | Bytes | Comments |
|---|---|---|---|
| Structure ID | Unsigned Short | 2 | |
| Device ID | Unsigned Integer | 4 | Device ID returned in the PUT_DEVICE_ID response. |
| Location | LOCATION | 20 | |
| GPSSNR | Byte | 1 | GPS Signal to noise ratio in dB |
| Battery Level | BATLEVEL | 2 | |
| Satellites | Byte | 1 | Number of satellites in view of the receiver. |
| Accuracy | Byte | 1 | Accuracy in meters. 255 is used for anything greater than 254. |
| DOP | Byte | 1 | Gradient; Dilution of Precision from the GPS, if available. |
| VDOP | Byte | 1 | Gradient; Vertical Dilution of Precision from the GPS, if available. |
| HDOP | Byte | 1 | Gradient; Horizontal Dilution of Precision from the GPS, if available. |
| Network Status | Byte | 1 | |
| TOTAL | | 28 | |

9.13 Structure PUT_SYSTEMTIME

PUT_SYSTEMTIME is used to respond to and acknowledge a GET_SYSTEMTIME request and to send the current UTC date and time at the host.

9.13.1 Protocol Usage

| UDP | Reverse HTTP | Direct HTTP | TCP | SMS |
|---|---|---|---|---|
| ✓ | ✓ | ✓ | ✓ | ✓ |

9.13.2 Orientation

| Mobile-to-host | Host-to-mobile |
|---|---|
| | ✓ |

9.13.3 Structure Definition

| Member Name | Data Type | Bytes | Comments |
|---|---|---|---|
| Structure ID | Unsigned Short | 2 | |
| System Time | DATETIME | 6 | UTC time at the host. |
| TOTAL | | 8 | |

9.14 Structure PUT_DEBUG_MESSAGE

PUT_DEBUG_MESSAGE is used to send debugging messages from the device to the server. This is a firmware defined implementation.

9.14.1 Protocol Usage

| UDP | Reverse HTTP | Direct HTTP | TCP | SMS |
|---|---|---|---|---|
| ✓ | ✓ | ✓ | ✓ | ✓ |

9.14.2 Orientation

| Mobile-to-host | Host-to-mobile |
|---|---|
| ✓ | |

9.14.3 Structure Definition

| Member Name | Data Type | Bytes | Comments |
|---|---|---|---|
| Structure ID | Unsigned Short | 2 | |
| Debug Message | Binary | Var | Variable length field. |
| TOTAL | | Var | |

10. Acknowledgements

Acknowledgements are generic positive and negative confirmations of requests and notifications. They are also used to carry "no operation" signaling for some transport models.

10.1 Structure ACK_MOBILE

ACK_MOBILE is a generic acknowledgement for requests from the host that do not have a specific response structure.

ACK_MOBILE is also used as a special purpose structure to open an HTTP transmission channel from the mobile to the host. The mobile will keep the HTTP session open for the period of time defined in the Timeout value in the Reverse HTTP Transport Envelope. If the host desired to send an application-layer request to the mobile, it creates a properly formatted request structure within a Reverse HTTP Transport Envelope, BINHEX encodes the entire payload, transmits the payload through the open socket, and closes the socket.

10.1.1 Protocol Usage

| UDP | Reverse HTTP | Direct HTTP | TCP | SMS |
|---|---|---|---|---|
| ✓ | ✓ | ✓ | ✓ | ✓ |

10.1.2 Orientation

| Mobile-to-host | Host-to-mobile |
|---|---|
| ✓ | |

10.1.3 Structure Definition

| Member Name | Data Type | Byte | Comments |
|---|---|---|---|
| Structure ID | Unsigned Short | 2 | |
| Device ID | Unsigned Integer | 4 | Device ID returned in the PUT_DEVICE_ID response |
| Acknowledgement | Unsigned Short | 2 | The Structure ID of the last transmission to acknowledge. |
| Baggage | Unsigned Short | 2 | Additional acknowledgement information. |
| TOTAL | | 10 | |

10.2 Structure ACK_HOST

ACK_HOST is a generic acknowledgement for requests from the mobile that do not have a specific response structure.

ACK_HOST is also a special purpose structure used to close an HTTP transmission channel from the when the timeout period is about to expire and the host does not need to submit a command to the mobile. ACK_HOST simple tells the mobile that the data session is still active. Typically, the mobile will reestablish a new HTTP session with the host, submitting an ACK_MOBILE structure. In Reverse HTTP High Interactivity mode, this reestablishment will occur immediately, and in Reverse HTTP Low Interactivity mode, the client will wait a defined amount of time before re-polling the host for a command.

10.2.1 Protocol Usage

| UDP | Reverse HTTP | Direct HTTP | TCP | SMS |
|---|---|---|---|---|
| | ✓ | | | |

10.2.2 Orientation

| Mobile-to-host | Host-to-mobile |
|---|---|
| | ✓ |

10.2.3 Structure Definition

| Member Name | Data Type | Byte | Comments |
|---|---|---|---|
| Structure ID | Unsigned Short | 2 | |
| Acknowledgement | Unsigned Short | 2 | The Structure ID of the last transmission to acknowledge. |
| Baggage | Unsigned Short | 2 | Additional acknowledgement information. |
| TOTAL | | 6 | |

10.3 Structure NACK_MOBILE

NACK_MOBILE is used to negatively acknowledge a request structure received by the mobile device. NACK should only be used if the envelope fails checksum verification or if an unsupported request is made by the host.

10.3.1 Protocol Usage

| UDP | Reverse HTTP | Direct HTTP | TCP | SMS |
|---|---|---|---|---|
| ✓ | ✓ | ✓ | ✓ | ✓ |

10.3.2 Orientation

| Mobile-to-host | Host-to-mobile |
|---|---|
| | ✓ |

10.3.3 Structure Definition

| Member Name | Data Type | Bytes | Comments |
|---|---|---|---|
| Structure ID | Unsigned Short | 2 | |
| Device ID | Unsigned Integer | 4 | Device ID returned in the PUT_DEVICE_ID response. Do not NACK an invalid response to GET_DEVICE_ID. Resend the GET_DEVICE_ID request. |
| Acknowledgement | Unsigned Short | 2 | The Structure ID of the transmission to that generated the error. |
| Baggage | Unsigned Short | 2 | Additional acknowledgement information. |
| Type | Byte | 1 | NACK Type constant |
| TOTAL | | 11 | |

10.4 Structure NACK_HOST

NACK_HOST is used to negatively acknowledge a request structure received by the host. NACK_HOST should only be used if the envelope fails checksum verification or if an unsupported request is made by the mobile.

10.4.1 Protocol Usage

| UDP | Reverse HTTP | Direct HTTP | TCP | SMS |
|---|---|---|---|---|
| ✓ | ✓ | ✓ | ✓ | ✓ |

10.4.2 Orientation

| Mobile-to-host | Host-to-mobile |
|---|---|
|  | ✓ |

10.4.3 Structure Definition

| Member Name | Data Type | Bytes | Comments |
|---|---|---|---|
| Structure ID | Unsigned Integer | 2 |  |
| Acknowledgement | Unsigned Short | 2 | The Structure ID of the transmission to that generated the error. |
| Baggage | Unsigned Short | 2 | Additional acknowledgement information. |
| Type | Byte | 1 | NACK Type constant |
| TOTAL |  | 7 |  |

11. UDP Transport Use Cases

UDP Transactions consist of a properly formatted request structure placed inside a properly formatted UDP transport envelope structure and sent to the GTX platform host address.

11.1 Mobile Client First-time Initialization or Cold-start

| Mobile-to-host | Host-to-mobile |
|---|---|
| GET_DEVICE_ID | PUT_DEVICE_ID |

11.2 Host Request Location

| Host-to-mobile | Mobile-to-host |
|---|---|
| GET_CURRENT_LOCATION | PUT_CURRENT_LOCATION |

11.3 Start or Stop Interval Location Reporting

| Host-to-mobile | Mobile-to-host |
|---|---|
| SET_REPORTING_INTERVAL | ACK_MOBILE |

After defined non-zero interval:

|  |
|---|
| PUT_LOCATION |

11.4 Host Request Battery Level

| Host-to-mobile | Mobile-to-host |
|---|---|
| GET_BATTERY_LEVEL | PUT_BATTERY_LEVEL |

11.5 Host Request Radio Status

| Host-to-mobile | Mobile-to-host |
|---|---|
| GET_RSSI | PUT_RSSI |

11.6 Host Request GPS Status

| Host-to-mobile | Mobile-to-host |
|---|---|
| GET_GPS_STATUS | PUT_GPS_STATUS |

11.7 Host Set GPS Power State

| Host-to-mobile | Mobile-to-host |
|---|---|
| SET_GPS_POWERSTATE | ACK_MOBILE |

11.8 Host Set Buffering Interval

| Host-to-mobile | Mobile-to-host |
|---|---|
| SET_BUFFERING_INTERVAL | ACK_MOBILE |

11.9 Start Buffered Data Transmission

| Host-to-mobile | Mobile-to-host |
|---|---|
| SET_START_BUFFER | PUT_LOCATION |

Repeats until a stop buffer transmission request is received or the newest record has been transmitted:

|  |
|---|
| PUT_LOCATION |

11.10 Stop Buffered Data Transmission

| Host-to-mobile | Mobile-to-host |
|---|---|
| END_BUFFERED_DATA | ACK_MOBILE |

11.11 Establish Circular Geofence

| Host-to-mobile | Mobile-to-host |
|---|---|
| GET_GEOFENCE_HANDLE | PUT_GEOFENCE_HANDLE |
| SET_CIRCULAR_GEOFENCE | ACK_MOBILE |

11.12 Establish Polygon Geofence

| Host-to-mobile | Mobile-to-host |
|---|---|
| GET_GEOFENCE_HANDLE | PUT_GEOFENCE_HANDLE |
| SET_POLYGON_GEOFENCE | ACK_MOBILE |

11.13 Establish Velocity Geofence

| Host-to-mobile | Mobile-to-host |
|---|---|
| GET_GEOFENCE_HANDLE | PUT_GEOFENCE_HANDLE |
| SET_VELOCITY_GEOFENCE | ACK_MOBILE |

11.14 Establish Stationary Geofence

| Host-to-mobile | Mobile-to-host |
|---|---|
| GET_GEOFENCE_HANDLE | PUT_GEOFENCE_HANDLE |
| SET_STATIONARY_GEOFENCE | ACK_MOBILE |

12. Reverse HTTP Transport Use Cases

Reverse HTTP Application-layer transactions are coupled with the HTTP transport-layer transaction for mobile-initiated requests and decoupled from the HTTP transport-layer transaction for host-initiated requests.

12.1 Mobile Client First-time Initialization or Cold-start

| Mobile-to-host | Host-to-mobile |
|---|---|
| GET_DEVICE_ID | PUT_DEVICE_ID |

12.2 Idle State: Mobile Waiting for Command from Host

| Mobile-to-host | Host-to-mobile |
|---|---|
| ACK_MOBILE | ACK_HOST |

In Reverse HTTP High Interactivity mode, a new HTTP session is established immediately. In Reverse HTTP Low Interactivity Mode, a defined interval elapses before the mobile re-polls the host for a command. If any mobile-initiated events occur during this period, the mobile established an HTTP session immediately and sends the host a structure.

| | |
|---|---|
| ACK_MOBILE | ACK_HOST or <any valid request> |

12.3 Host Request Location

| Mobile-to-host | Host-to-mobile |
|---|---|
| ACK_MOBILE | GET_CURRENT_LOCATION |
| PUT_CURRENT_LOCATION | <any valid request> |

12.4 Start or Stop Interval Location Reporting

| Mobile-to-host | Host-to-mobile |
|---|---|
| ACK_MOBILE | SET_REPORTING_INTERVAL |
| ACK_MOBILE | <any valid request> |

After defined non-zero interval:

| | |
|---|---|
| PUT_LOCATION | <any valid request> |

12.5 Host Request Battery Level

| Mobile-to-host | Host-to-mobile |
|---|---|
| ACK_MOBILE | GET_BATTERY_LEVEL |
| PUT_BATTERY_LEVEL | <any valid request> |

12.6 Host Request Radio Status

| Mobile-to-host | Host-to-mobile |
|---|---|
| ACK_MOBILE | GET_RSSI |
| PUT_RSSI | <any valid request> |

12.7 Host Request GPS Status

| Mobile-to-host | Host-to-mobile |
|---|---|
| ACK_MOBILE | GET_GPS_STATUS |
| PUT_GPS_STATUS | <any valid request> |

12.8 Host Set GPS Power State

| Mobile-to-host | Host-to-mobile |
|---|---|
| ACK_MOBILE | SET_GPS_POWERSTATE |
| ACK_MOBILE | <any valid request> |

12.9 Host Set Buffering Interval

| Mobile-to-host | Host-to-mobile |
|---|---|
| ACK_MOBILE | SET_BUFFERING_INTERVAL |
| ACK_MOBILE | <any valid request> |

12.10 Start Buffered Data Transmission

| Mobile-to-host | Host-to-mobile |
|---|---|
| ACK_MOBILE | GET_BUFFER |
| PUT_LOCATION | <any valid request> |

After defined non-zero interval:

| PUT_LOCATION | <any valid request> |

12.11 End Buffered Data Transmission

| Mobile-to-host | Host-to-mobile |
|---|---|
| ACK_MOBILE | END_BUFFERED_DATA |
| ACK_MOBILE | <any valid request> |

12.12 Set Heartbeat Interval

| Mobile-to-host | Host-to-mobile |
|---|---|
| ACK_MOBILE | SET_HEARTBEAT_INTERVAL |
| ACK_MOBILE | <any valid request> |

12.13 Set Interactivity Mode

| Mobile-to-host | Host-to-mobile |
|---|---|
| ACK_MOBILE | SET_INTERACTIVITY_MODE |
| ACK_MOBILE | <any valid request> |

Figure 5:
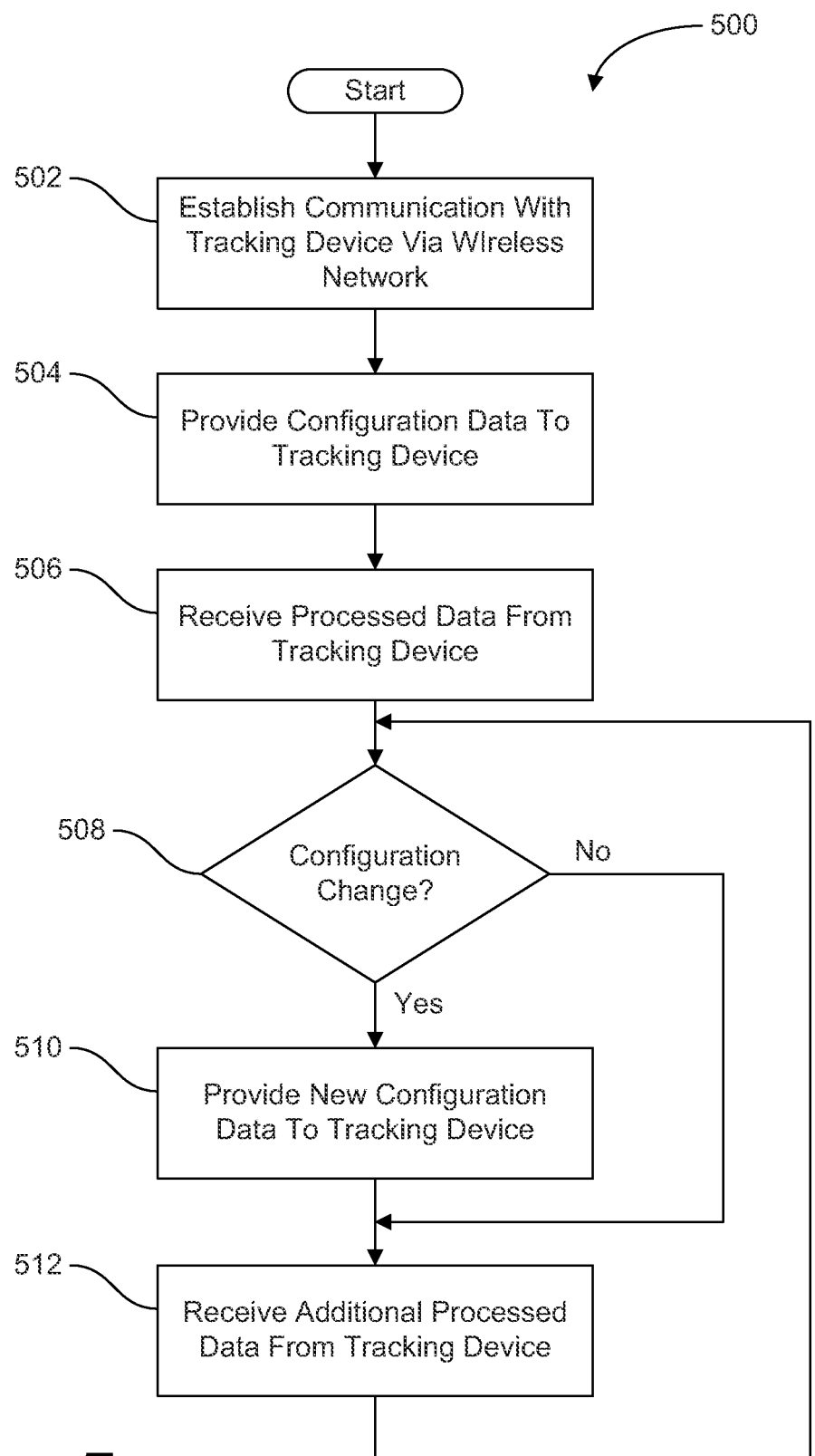
FIG. 5 is a flow chart summarizing an example method of communicating with the tracking device of FIG. 1 and FIG. 4.

FIG. 5 is a flow chart summarizing a method 500 for communicating with a tracking device using, for example, the above-described communication protocol. In a first step 502, communication is established between the tracking device (e.g., tracking device 102) and a remote system (e.g., system 104) via a wireless network (e.g., a mobile phone network). Then, in a second step 504 configuration data is provided to the tracking device from the remote server. Next, in a third step 506, the remote server receives processed data from the tracking device. Then, in a fourth step 508 a determination is made whether the configuration of the tracking device should be changed. If so, then in a fifth step 510, different configuration data is provided to the tracking device to reconfigure the tracking device. Then, in a sixth step 512, the remote system receives additional processed data from the tracking device, which has been processed and/or provided by the tracking device in the tracking device's new configuration. If in fourth step 508 it is determined that no configuration change is necessary, then method 500 proceeds to sixth step 512 where the remote system receives addition processed data from the tracking device, but the additional processed data will have been processed and/or provided by the tracking device in the tracking device's first configuration.

The description of particular example embodiments of the present invention is now complete. Many of the described features may be substituted, altered or omitted without departing from the scope of the invention. For example, the tracking devices of the present invention can be embodied in an article of clothing worn by a tracked subject. As another example, tracking devices 102 and/or subscriber systems 118 can be embodied in GPS enabled mobile telephones or other hand-held position determining devices. These and other deviations from the particular embodiments shown will be apparent to those skilled in the art, particularly in view of the foregoing disclosure.

We claim:

1. A tracking device comprising:
a location detector operative to determine locations of said tracking device;
a communication device operative to communicate with a plurality of remote systems including a tracking service system associated with a tracking service provider and a device of a user associated with said tracking device;
memory for storing data and code, said data including location data determined by said location detector and configuration data;
a processor operative to execute said code to impart functionality to said tracking device, said functionality of said tracking device depending at least in part on said configuration data; and
a configuration routine operative to modify said configuration data responsive to a communication from any of said remote systems; and
wherein said configuration data modifiable responsive to said communication from any of said remote systems at least partially determines an interval for buffering said location data when said communication device is unable to communicate said location data to at least one of said remote systems; and
wherein said interval for buffering at least partially controls how frequently newly acquired location data will be stored in said memory.

2. The tracking device of claim 1, wherein said configuration data modifiable responsive to said communication from any of said remote systems at least partially determines an interval for communicating said location data to at least one of said remote systems.

3. The tracking device of claim 2, wherein:
said interval for buffering is different than said interval for communicating.

4. The tracking device of claim 1, wherein said interval for buffering said location data is a time interval.

5. The tracking device of claim 1, wherein said interval for buffering said location data is a distance interval.

6. The tracking device of claim 1, wherein said configuration data modifiable responsive to said communication from any of said remote systems at least partially determines a power state of said location detector, said power state governing the power usage of said location detector.

7. The tracking device of claim 1, wherein said configuration data modifiable responsive to said communication from any of said remote systems at least partially determines a monitored condition with respect to said location of said tracking device.

8. The tracking device of claim 7, wherein said monitored condition is an area.

9. The tracking device of claim 8, wherein said area is a circular area.

10. The tracking device of claim 8, wherein said area is a polygonal area.

11. The tracking device of claim 7, wherein said monitored condition is a velocity.

12. The tracking device of claim 7, wherein said monitored condition is a time that said tracking device remains stationary.

13. The tracking device of claim 7, wherein said monitored condition is a distance that if traveled by said tracking device results in an alert being communicated to at least one of said remote systems.

14. The tracking device of claim 1, wherein said configuration data modifiable responsive to said communication from any of said remote systems at least partially determines an interval for communicating diagnostic information from said tracking device to at least one of said remote systems.

15. The tracking device of claim 1, further comprising a data transfer routine operative to communicate operational data between said tracking device and at least one of said remote systems.

16. The tracking device of claim 15, wherein said data transfer routine, responsive to a request from one of said remote systems, is operative to communicate data indicative of a battery status to at least said one of said remote systems that made said request.

17. The tracking device of claim 15, wherein said data transfer routine, responsive to a request from one of said remote systems, is operative to communicate data indicative of a radio signal strength to at least said one of said remote systems that made said request.

18. The tracking device of claim 15, wherein said data transfer routine, responsive to a request from one of said remote systems, is operative to communicate data indicative of a status of said location detector to at least said one of said remote systems that made said request.

19. The tracking device of claim 15, wherein said data transfer routine, responsive to a status of a monitored location condition, is operative to communicate data indicative of a violation or satisfaction of said location condition to said at least one of said remote systems.

20. The tracking device of claim 15, wherein:
when said communication device is unable to establish a connection with at least one of said remote systems, said location data is accumulated in said memory; and
when said communication device is able to establish a connection with said at least one of said remote systems, said data transfer routine communicates said accumulated data to said at least one of said remote systems.

21. The tracking device of claim 15, wherein said data transfer routine, responsive to a request from one of said remote systems, is operative to communicate diagnostic data to said at least one of said remote systems that made said request.

22. The tracking device of claim 1, wherein:
responsive to a first command from any of said remote systems said configuration data is modified to set a new interval for buffering said location data; and
responsive to a different command from any of said remote systems said configuration data is modified to set a new interval for reporting said location data.

23. A method for communicating with a tracking device, said method comprising:
communicating with said tracking device via a wireless network;
providing configuration data to said tracking device via said wireless network, said configuration data causing said tracking device to operate according to a first configuration;
receiving processed data from said tracking device, said processed data being generated by said tracking device in said first configuration;
providing new configuration data to said tracking device via said wireless network, said new configuration data changing said first configuration of said tracking device to a different configuration; and
receiving additional processed data from said tracking device, said additional processed data being generated by said tracking device in said different configuration; and
wherein said configuration data at least partially determines a location data buffering interval; and
wherein said location data buffering interval at least partially controls how frequently newly acquired location data will be stored in said memory.

24. The method of claim 23, wherein said configuration data at least partially determines a location data reporting interval.

25. The method of claim 24, wherein said configuration data at least partially determines a location data buffering interval different than said location data reporting interval.

26. The method of claim 24, wherein providing configuration data to said tracking device includes:
providing a first command to said tracking device to set said location data reporting interval; and
providing a different command to said tracking device to set said location data buffering interval.

27. The method of claim 23, wherein said configuration data at least partially determines a power state of said tracking device, said power state governing the power usage of said tracking device.

28. The method of claim 23, wherein said configuration data at least partially determines a location based condition that if violated or satisfied causes an indication of said violation or satisfaction of said location based condition to be communicated from said tracking device.

29. The method of claim 23, wherein said configuration data at least partially determines a diagnostic reporting interval.

30. The method of claim 23, wherein said processed data includes data indicative of a battery status of said tracking device.

31. The method of claim 23, wherein said processed data includes data indicative of a radio signal strength determined by said tracking device.

32. The method of claim 23, wherein said processed data includes data generated by a diagnostic routine of said tracking device.

33. The method of claim 23, wherein:
said first configuration is associated with a first tracking function; and
said different configuration is associated with a different tracking function.

34. A tracking device comprising:
a location detector operative to determine locations of said tracking device;
a communication device operative to communicate with a plurality of remote systems including a tracking service system associated with a tracking service provider and a device of a user associated with said tracking device;
memory for storing data and code, said data including location data determined by said location detector and configuration data, said configuration data at least partially determining a location data buffering interval, said location data buffering interval determining how often new location data will be stored in said memory;
a processor operative to execute said code to impart functionality to said tracking device, said functionality of said tracking device depending at least in part on said configuration data; and
means for modifying said configuration data responsive to a communication from any of said remote systems.

35. A non-transitory, electronically-readable storage medium having code embodied therein for causing an electronic device to:
communicate with a tracking device via a wireless network;

provide configuration data to said tracking device via said wireless network, said configuration data causing said tracking device to operate according to a first configuration;

receive processed data from said tracking device, said processed data being generated by said tracking device in said first configuration;

provide new configuration data to said tracking device via said wireless network, said new configuration data changing said first configuration of said tracking device to a different configuration; and receive additional processed data from said tracking device, said additional processed data being generated by said tracking device in said different configuration; and wherein said configuration data at least partially determines a location data buffering interval, said location data buffering interval determining how frequently said tracking device stores new location data when said communication with said tracking device is interrupted.

36. A tracking device comprising:

a location detector operative to determine locations of said tracking device;

a communication device operative to communicate with a plurality of remote systems Including a tracking service system associated with a tracking service provider And a device of a user associated with said tracking device;

memory for storing data and code, said data including location data determined by Said location detector and configuration data;

a processor operative to execute said code to impart functionality to said tracking Device, said functionality of said tracking device depending at least in part on said configuration data;

a configuration routine operative to modify said configuration data responsive to a communication from any of said remote systems; and a data transfer routine operative to communicate operational data between said tracking device and at least one of said remote systems; and wherein when said communication device is unable to establish a connection with at least one of said remote systems, said location data is accumulated in said memory, said accumulated location data indicative of a plurality of locations; and when said communication device is able to establish a connection with said at least one of said remote systems, said data transfer routine communicates said accumulated data to said at least one said remote systems.

* * * * *